(12) United States Patent
Amanai

(10) Patent No.: US 7,262,890 B2
(45) Date of Patent: Aug. 28, 2007

(54) OBSERVATION OPTICAL SYSTEM

(75) Inventor: Takahiro Amanai, Sagamihara (JP)

(73) Assignee: Olympus Corporation, Tokyo (JP)

( * ) Notice: Subject to any disclaimer, the term of this patent is extended or adjusted under 35 U.S.C. 154(b) by 225 days.

(21) Appl. No.: 11/031,999

(22) Filed: Jan. 11, 2005

(65) Prior Publication Data

US 2005/0254107 A1    Nov. 17, 2005

(30) Foreign Application Priority Data

Jan. 14, 2004    (JP)    ............................. 2004-007090

(51) Int. Cl.
*G02B 13/14*    (2006.01)

(52) U.S. Cl. ............................. 359/16; 359/13; 359/15; 359/631; 359/638

(58) Field of Classification Search ............ 359/13–16, 359/633, 638–640, 630, 631; 348/115; 345/7–9
See application file for complete search history.

(56) References Cited

U.S. PATENT DOCUMENTS

| | | | |
|---|---|---|---|
| 6,137,602 A | 10/2000 | Mukawa | |
| 6,331,916 B1 * | 12/2001 | Mukawa | ...................... 359/630 |
| 6,801,347 B2 | 10/2004 | Nakamura et al. | |
| 6,822,770 B1 * | 11/2004 | Takeyama | ..................... 359/13 |
| 2002/0060850 A1 * | 5/2002 | Takeyama | .................... 359/630 |
| 2004/0233488 A1 | 11/2004 | Kasai et al. | |

* cited by examiner

*Primary Examiner*—Leonidas Boutsikaris
(74) *Attorney, Agent, or Firm*—Kenyon & Kenyon LLP

(57) ABSTRACT

An observation optical system has an entrance surface, a reflecting surface, and an exit surface. At least one of these surfaces is configured as a free-formed surface, to which a volume holographic optical element (HOE) is closely adhered. The observation optical system satisfies the following conditions:

$$-0.20 < \phi x/Px < 0.30$$

$$-0.20 < \phi y/Py < 0.20$$

where $\phi x$ is the power of only the HOE in an x direction at the point of intersection of an axial principal ray with the surface of the HOE, $\phi y$ is the power of only the HOE in a y direction (parallel to the direction of decentration) at the point of intersection of the axial principal ray with the surface of the HOE, Px is the power of the whole of the observation optical system in the x direction, and Py is the power of the whole of the observation optical system in the y direction.

6 Claims, 23 Drawing Sheets

FIG.2A Y-FAN
FIG.2B X-FAN
(X,Y)
0.00, 0.00
RELATIVE FIELD
( 0.00° , 0.00° )
1
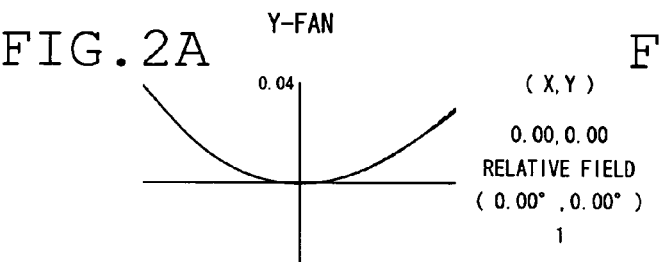
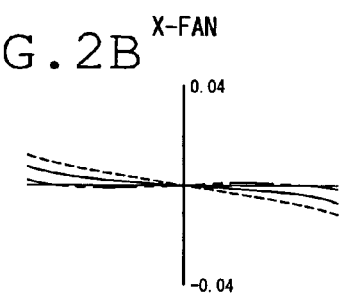
FIG.2C
FIG.2D
0.00, -1.00
RELATIVE FIELD
( 0.00° , -4.51° )
2
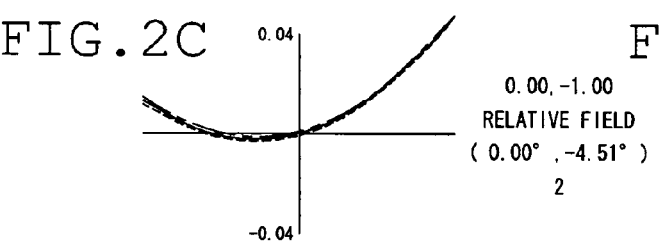
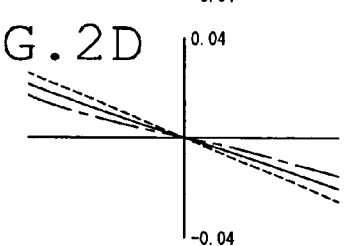
FIG.2E
FIG.2F
1.00, -1.00
RELATIVE FIELD
( 6.00° , -4.51° )
3
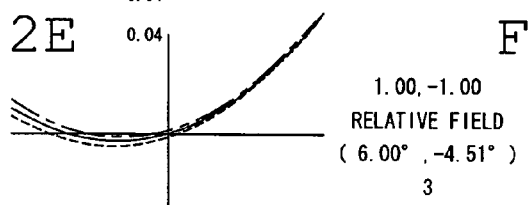
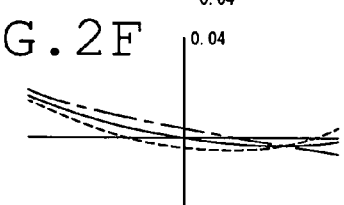
FIG.2G
FIG.2H
1.00, 0.00
RELATIVE FIELD
( 6.00° , 0.00° )
4
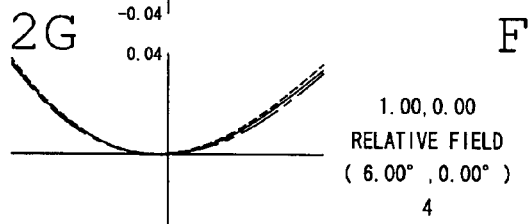
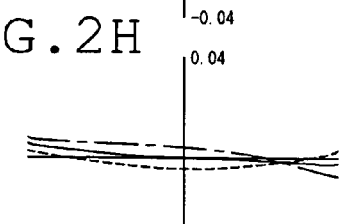
FIG.2I
FIG.2J
1.00, 1.00
RELATIVE FIELD
( 6.00° , 4.51° )
5
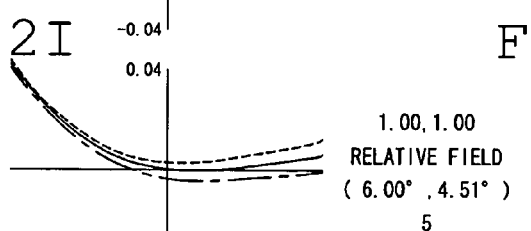
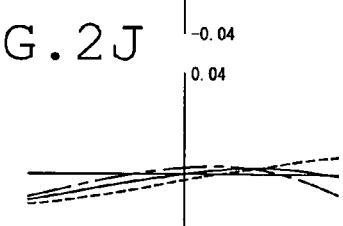
FIG.2K
FIG.2L
0.00, 1.00
RELATIVE FIELD
( 0.00° , 4.51° )
6
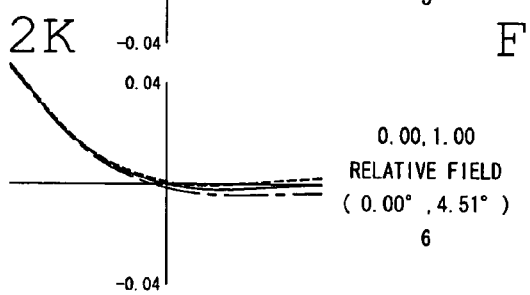
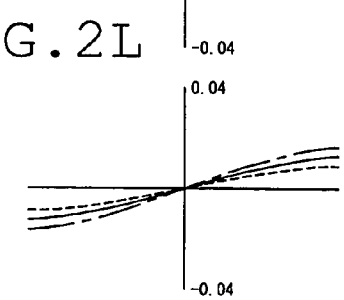
------------ 542.0000 NM
———————— 532.0000 NM
— — — — 522.0000 NM FIG.8A Y-FAN
FIG.8B X-FAN
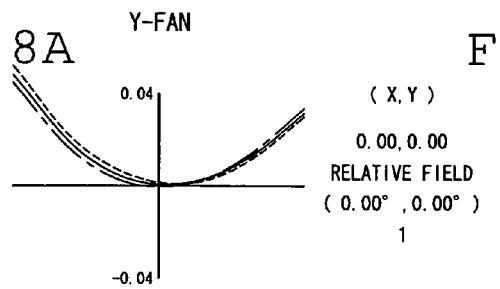
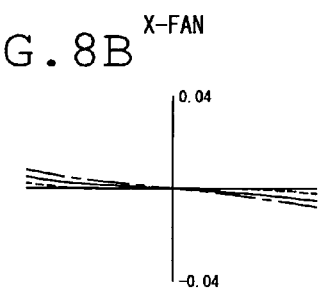
(X,Y)
0.00, 0.00
RELATIVE FIELD
( 0.00° , 0.00° )
1
FIG.8C
FIG.8D
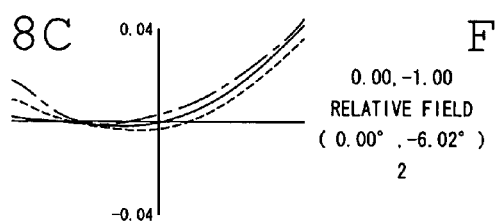
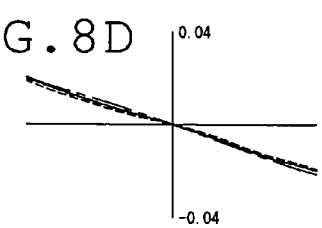
0.00, -1.00
RELATIVE FIELD
( 0.00° , -6.02° )
2
FIG.8E
FIG.8F
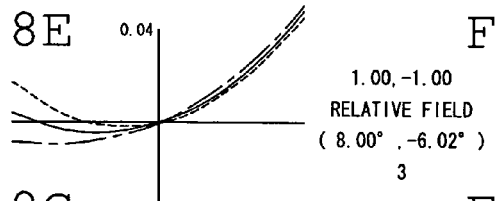
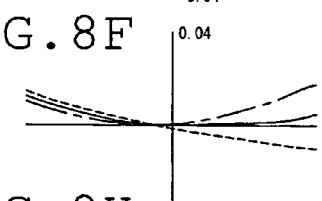
1.00, -1.00
RELATIVE FIELD
( 8.00° , -6.02° )
3
FIG.8G
FIG.8H
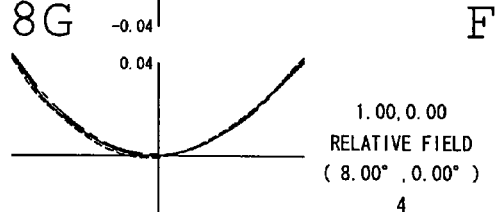
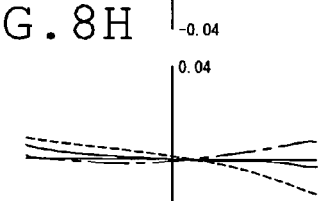
1.00, 0.00
RELATIVE FIELD
( 8.00° , 0.00° )
4
FIG.8I
FIG.8J
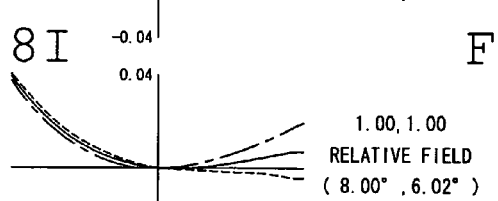
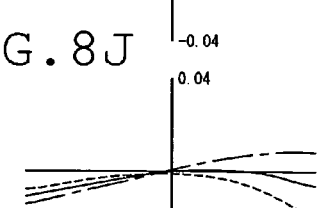
1.00, 1.00
RELATIVE FIELD
( 8.00° , 6.02° )
5
FIG.8K
FIG.8L
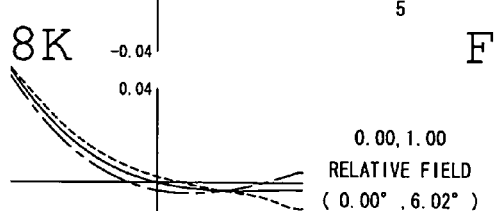
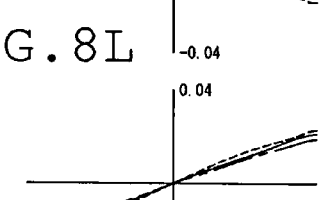
0.00, 1.00
RELATIVE FIELD
( 0.00° , 6.02° )
6
------------ 542.0000 NM
———— 532.0000 NM
— - — - — 522.0000 NM

OBSERVATION OPTICAL SYSTEM

This application claims benefits of Japanese Application No. 2004-007090 filed in Japan on Jan. 14, 2004, the contents of which are incorporated by this reference.

BACKGROUND OF THE INVENTION

1. Field of the Invention

This invention relates to an observation optical system, and in particular, to an observation optical system for an image display apparatus that can be mounted on a viewer's head or face and can be incorporated in a mobile phone or a personal digital assistant.

2. Description of Related Art

In recent years, for the purpose that each individual person enjoys an image displayed on a large screen, the development of an image display apparatus has taken place. In particular, image display apparatuses of the type mounted on the head or face have been conspicuously developed. The recent widespread use of mobile phones and personal digital assistants has increased the need that data of images and letters of the mobile phones and personal digital assistants should be viewed through large screens. Conventional optical systems used in the image display apparatuses are disclosed, for example, in Japanese Patent Kokai Nos. 2001-264682, 2002-107658, and Hei 11-326824. Each of such optical systems has the structure that a holographic optical element (which is hereinafter abbreviated to HOE) is cemented to a reflecting surface, and the surface of this optical element is decentered and placed. Thus, in each of these prior art publications, a small-sized optical system is proposed.

SUMMARY OF THE INVENTION

The observation optical system according to the present invention has an entrance surface, a reflecting surface, and an exit surface. At least one of these surfaces is configured as a free-formed surface, on which a volume holographic optical element (HOE) is provided.

Further, the observation optical system according to the present invention has an entrance surface, a reflecting surface, and an exit surface, and includes a prism in which the reflecting surface is configured as a free-formed surface and a volume holographic optical element (HOE) provided to the free-formed surface of the prism.

Still further, the observation optical system according to the present invention includes an image display element; an eyepiece optical system introducing an image formed by the image display element into the center of a viewer's eye so that the viewer is capable of observing the image as a virtual image; and a see-through optical element provided in the direction of a visual axis of the eyepiece optical system, canceling power in the direction of the visual axis and introducing an outside image in the direction of the visual axis into the center of the viewer's eye so that an image formed by the image display element with respect to the outside image is displayed as a virtual image and can be superimposed on the outside image to make observations. The eyepiece optical system has an entrance surface, a reflecting surface, and an exit surface, and includes a prism in which the reflecting surface is configured as a free-formed surface and a volume holographic optical element (HOE) provided to the free-formed surface of the prism, the volume holographic optical element being placed on the visual axis.

Here, the visual axis refers to a straight line connecting the virtual image with the center of the viewer's eye.

According to the present invention, the volume holographic optical element is made to come in close contact with the free-formed surface, and the free-formed surface satisfies the following equation:

$$Z = cr^2 / [1 + \sqrt{\{1 - (1+k)c^2 r^2\}}] + \sum_{j=2}^{66} C_j X^m Y^n$$

Here, the first term of the equation is a spherical surface term, and the second term is a free-formed surface term. In the spherical surface term, c is curvature at the vertex, k is a conic constant, and $r = \sqrt{(X^2 + Y^2)}$.

The observation optical system according to the present invention satisfies all of the following conditions:

$-0.20 < \phi x/Px < 0.30$ $-0.20 < \phi y/Py < 0.20$ where $\phi x$ is the power of only the HOE in an x direction at the point of intersection of an axial principal ray with the surface of the HOE, $\phi y$ is the power of only the HOE in a y direction (parallel to the direction of decentration) at the point of intersection of the axial principal ray with the surface of the HOE, Px is the power of the whole of the observation optical system in the x direction, and Py is the power of the whole of the observation optical system in the y direction.

The observation optical system according to the present invention satisfies all of the following conditions:

$-0.28 < \phi x/\Phi x < 0.39$ $-0.29 < \phi y/\Phi y < 0.35$ $-0.52 < \phi mx/\Phi mx < 1.30$ $-0.52 < \phi my/\Phi my < 1.30$ where $\Phi x$ is the power of only a geometric configuration of a substrate in the x direction at the point of intersection of the axial principal ray with the surface of the HOE, $\Phi y$ is the power of only the geometric configuration of the substrate in the y direction (parallel to the direction of decentration) at the point of intersection of the axial principal ray with the surface of the HOE, $\phi mx$ is the power of only the HOE in the x direction at the maximum and minimum values on the x axis within an effective ray limit, $\phi my$ is the power of only the HOE in the y direction (parallel to the direction of decentration) at the maximum and minimum values on the y axis within the effective ray limit, $\Phi mx$ is the power of only the geometric configuration of the substrate in the x direction at the maximum and minimum values on the x axis within the effective ray limit, and $\Phi my$ is the power of only the geometric configuration of the substrate in the y direction (parallel to the direction of decentration) at the maximum and minimum values on the y axis within the effective ray limit.

According to the present invention, the observation optical system that is capable of effectively suppressing the production of decentration aberration and chromatic aberration, is good in imaging performance, and uses the HOE bringing about high resolution is obtained.

These and other features and advantages of the present invention will become apparent from the following detailed description of the preferred embodiments when taken in conjunction with the accompanying drawings.

BRIEF DESCRIPTION OF THE DRAWINGS

FIGS. 2A-2L are diagrams showing transverse aberration characteristics of the observation optical system of Embodiment 1;

FIGS. 8A-8L are diagrams showing transverse aberration characteristics of the observation optical system of Embodiment 4;

DETAILED DESCRIPTION OF THE PREFERRED EMBODIMENTS

Figure 1:
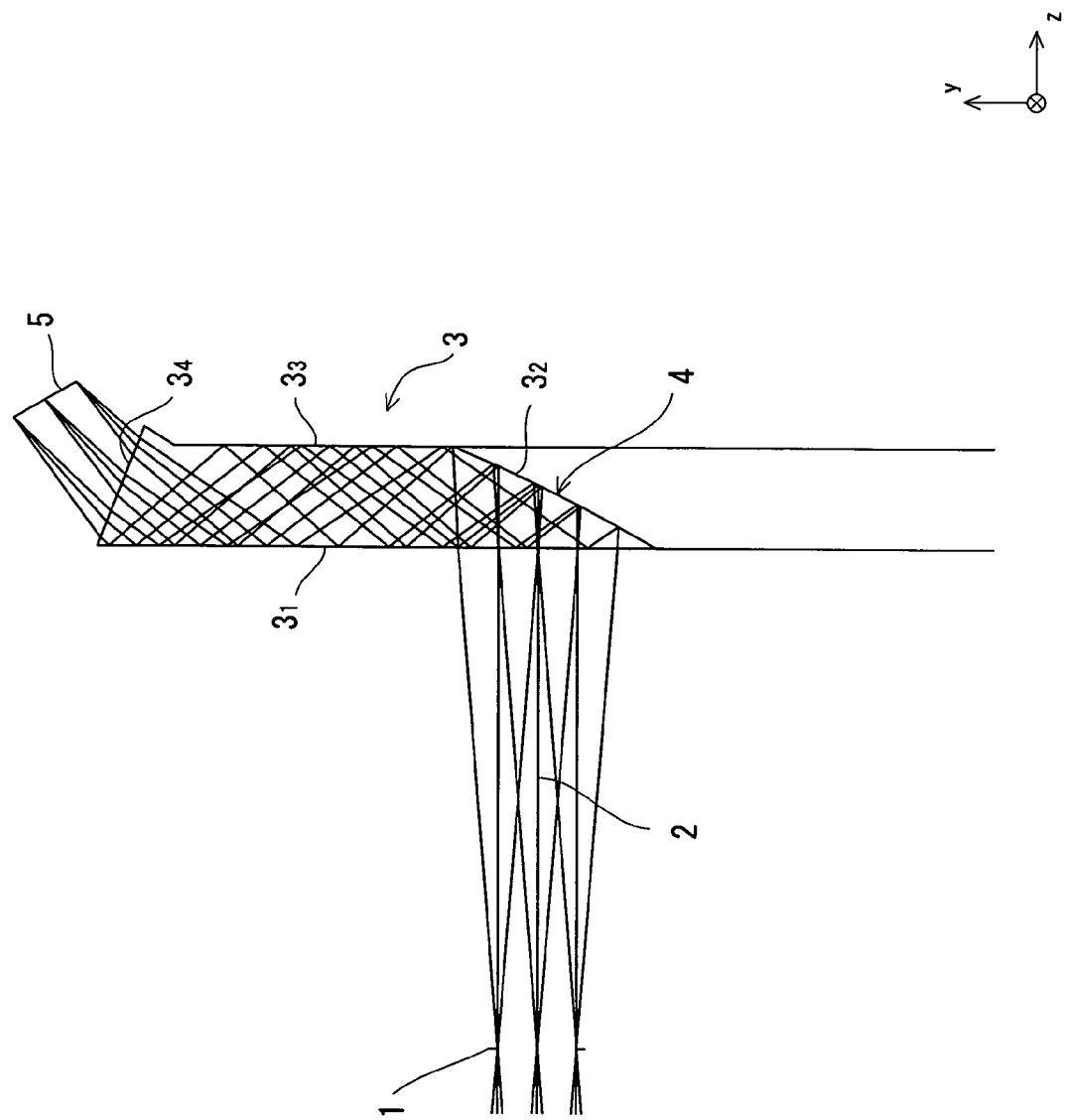
FIG. 1 is a Y-Z sectional view including the optical axis of the observation optical system of Embodiment 1 in the present invention.

Before undertaking the description of the embodiments, the function and effect of the present invention will be explained.

The observation optical system of the present invention has an entrance surface, a reflecting surface, and an exit surface as optical-function surfaces. At least one of these surfaces is configured as a free-formed surface. In addition, the HOE is provided to the optical-function surface configured as the free-formed surface. Also, each of the entrance surface, the reflecting surface, and the exit surface corresponds to a substrate, on which the HOE is provided.

It is desirable that the HOE is closely adhered to the optical-function surface as the free-formed surface. By doing so, the angle of incidence of a ray of light on the HOE and the angle of diffraction of the ray can be reduced. This means that the amount of production of decentration aberration and chromatic aberration in the HOE becomes small. As a consequence, a higher-resolution observation image can be obtained.

When an optical system is constructed like the present invention, the geometric configuration of the substrate is changed to the free-formed surface and thereby the power of an asymmetrical free-formed surface of the HOE itself can be lessened. Hence, asymmetrical chromatic aberration produced in the HOE itself can be made small. Consequently, according to the present invention, a higher-resolution observation optical system can be realized.

Here, a brief description will be given of correction for chromatic aberration. Color dispersion due to refraction (by an optical member such as a prism) and diffraction (by the HOE) occurs so that positive and negative states are reversed. Therefore, when the HOE is used, chromatic aberration produced by a refracting surface can be efficiently corrected. The HOE, however, has a negative dispersion property of the Abbe's number as large as −3.45. Consequently, if extremely high power is imparted to the HOE, imaging performance will be impaired.

Now, consider the case where an image displayed on a display element is observed through the observation optical system. In this case, principal rays emanate nearly parallel from the display element toward the surface of the HOE. The principal rays emanating from the display element converge at the surface of the HOE toward a stop. At this time, the optical system is such that most of power for a converging function is obtained by the geometric configuration of the substrate. Specifically, the power of the free-formed surface is imparted to at least one of the entrance surface, the reflecting surface, and the exit surface. By doing so, the power for the converging function in the HOE can be considerably lessened. That is, the power of the HOE can be fully utilized for correcting chromatic aberration.

In order to make efficient correction for chromatic aberration, it is desirable that the observation optical system of the present invention satisfies the following conditions:

$$-0.20 < \phi x/Px < 0.30 \quad (1)$$

$$-0.20 < \phi y/Py < 0.20 \quad (2)$$

where ϕx is the power of only the HOE in an x direction at the point of intersection of an axial principal ray with the surface of the HOE, ϕy is the power of only the HOE in a y direction (parallel to the direction of decentration) at the point of intersection of the axial principal ray with the surface of the HOE, Px is the power of the whole of the observation optical system in the x direction, and Py is the power of the whole of the observation optical system in the y direction.

Outside the upper limit or the lower limit of each of Conditions (1) and (2), the power of the HOE becomes extremely high. As such, it becomes difficult that chromatic aberration produced in the HOE is eliminated by another refracting surface, and favorable optical performance cannot be attained.

The observation optical system of the present invention preferably satisfies the following conditions:

$$-0.15 < \phi x/Px < 0.20 \quad (1')$$

$$-0.15 < \phi y/Py < 0.15 \quad (2')$$

Further, the observation optical system of the present invention preferably satisfies the following conditions:

$$-0.10 < \phi x/Px < 0.15 \quad (1'')$$

$$-0.10 < \phi y/Py < 0.10 \quad (2'')$$

In order to correct aberrations of the optical system, the geometric configuration of the surface of the substrate varies in power with the center and the periphery. Therefore, in the case where an arrangement is made such that refracting surfaces are located before and behind the HOE, asymmetrical, non-linear chromatic aberrations are produced by the refracting surfaces.

Thus, there is the need to efficiently correct the asymmetrical, non-linear chromatic aberrations. For this purpose, it is desirable to vary the power at the center and on the periphery, as well as the power of the HOE itself, in accordance with the geometric configuration of the surface of the substrate.

It is desirable that the observation optical system of the present invention satisfies the following conditions:

$$-0.28 < \phi x/\Phi x < 0.39 \quad (3)$$

$$-0.29 < \phi y/\Phi y < 0.35 \quad (4)$$

$$-0.52 < \phi mx/\Phi mx < 1.30 \quad (5)$$

$$-0.52 < \phi my/\Phi my < 1.30 \quad (6)$$

where Φx is the power of only a geometric configuration of a substrate in the x direction at the point of intersection of the axial principal ray with the surface of the HOE, Φy is the power of only the geometric configuration of the substrate in the y direction (parallel to the direction of decentration) at the point of intersection of the axial principal ray with the surface of the HOE, ϕmx is the power of only the HOE in the x direction at the maximum and minimum values on the x axis within an effective ray limit, ϕmy is the power of only the HOE in the y direction (parallel to the direction of decentration) at the maximum and minimum values on the y axis within the effective ray limit, Φmx is the power of only the geometric configuration of the substrate in the x direction at the maximum and minimum values on the x axis within the effective ray limit, and Φmy is the power of only the geometric configuration of the substrate in the y direction (parallel to the direction of decentration) at the maximum and minimum values on the y axis within the effective ray limit.

If the value of each of the conditions becomes so small as to be below the lower limit, the power of the HOE itself is extremely lessened, resulting in undercorrection of chromatic aberration.

On the other hand, if the value of each condition becomes so large as to be beyond the upper limit, the power of the HOE itself is extremely increased. Consequently, the amount of correction for chromatic aberration in the HOE becomes pronounced, resulting in overcorrection of chromatic aberration.

The observation optical system of the present invention preferably satisfies the following conditions:

$$-0.18 < \phi x/\Phi x < 0.29 \quad (3')$$

$$-0.19 < \phi y/\Phi y < 0.25 \quad (4')$$

$$-0.42 < \phi mx/\Phi mx < 1.20 \quad (5')$$

$$-0.42 < \phi my/\Phi my < 1.20 \quad (6')$$

Further, the observation optical system of the present invention preferably satisfies the following conditions:

$$-0.08 < \phi x/\Phi x < 0.19 \quad (3'')$$

$$-0.09 < \phi y/\Phi y < 0.15 \quad (4'')$$

$$-0.32 < \phi mx/\Phi mx < 1.10 \quad (5'')$$

$$-0.32 < \phi my/\Phi my < 1.10 \quad (6'')$$

The observation optical system according to the present invention includes an image display element; an eyepiece optical system introducing an image formed by the image display element into the center of a viewer's eye so that the viewer is capable of observing the image as a virtual image; and a see-through optical element provided in the direction of a visual axis of the eyepiece optical system, canceling power in the direction of the visual axis and introducing an outside image in the direction of the visual axis into the center of the viewer's eye so that an image formed by the image display element with respect to the outside image is displayed as a virtual image and can be superimposed on the outside image to make observations. The eyepiece optical system has an entrance surface, a reflecting surface, and an exit surface, and includes a prism in which the reflecting surface is a free-formed surface and a volume holographic optical element (HOE) provided to the free-formed surface of the prism, the volume holographic optical element being placed on the visual axis. Here, the visual axis refers to a straight line connecting the virtual image with the center of the viewer's eye.

In the observation optical system of the present invention, the axial principal ray is defined as a ray that passes through the center of the exit pupil and reaches the center of the image display element. An optical axis expressed by a straight line along which the axial principal ray travels through the center of the exit pupil and intersects with a first surface of the optical system is defined as the Z axis, an axis perpendicular to the Z axis and situated in a decentering plane of each surface constituting the substrate to which the HOE is closely adhered is defined as the Y axis, and an axis perpendicular to the Z axis and to the Y axis on a local coordinate plane of each surface is defined as the X axis. Also, as the substrate, an optical member, for example, a prism member, can be cited.

The center of the exit pupil is set as the origin of the coordinate system in the observation optical system of the present invention. In the present invention, the face number is assigned by applying reverse ray tracing from the exit pupil toward the image display element as mentioned above. The direction along which the axial principal ray emerges from the exit pupil and reaches the image display element is defined as the positive direction of the Z axis, the direction of the Y axis along which the ray is directed toward the image display element is defined as the positive direction of the Y axis, and the direction of the X axis constituting the right-handed coordinate system with the Y axis and the Z axis is defined as the positive direction of the X axis.

Here, the free-formed surface used in the present invention is defined by an equation shown below. The Z axis of this equation corresponds to the axis of the free-formed surface.

$$Z = cr^2 / \left[1 + \sqrt{\{1 - (1+k)c^2 r^2\}}\right] + \sum_{j=2}^{66} C_j X^m Y^n \quad (7)$$

However, the first term of Equation (7) is a spherical surface term, and the second term is a free-formed surface term. In the spherical surface term, c is curvature at the vertex, k is a conic constant, and $r = \sqrt{(X^2 + Y^2)}$.

The free-formed surface term can be developed as follows:

$$\sum_{j=2}^{66} C_j X^m Y^n = C_2 X + C_3 Y + C_4 X^2 + C_5 XY + C_6 Y^2 + C_7 X^3 + \quad (8)$$

$$C_8 X^2 Y + C_9 XY^2 + C_{10} Y^3 + C_{11} X^4 + C_{12} X^3 Y + C_{13} X^2 Y^2 +$$

$$C_{14} XY^3 + C_{15} Y^4 + C_{16} X^5 + C_{17} X^4 Y + C_{18} X^3 Y^2 + C_{19} X^2 Y^3 +$$

$$C_{20} XY^4 + C_{21} Y^5 + C_{22} X^6 + C_{23} X^5 Y + C_{24} X^4 Y^2 + C_{25} X^3 Y^3 +$$

-continued
$$C_{26} X^2 Y^4 + C_{27} XY^5 + C_{28} Y^6 + C_{29} X^7 + C_{30} X^6 Y + C_{31} X^5 Y^2 +$$

$$C_{32} X^4 Y^3 + C_{33} X^3 Y^4 + C_{34} X^2 Y^5 + C_{35} XY^6 + C_{36} Y^7$$

. . . . .

where $C_j$ (j is an integral number of 2 or larger) is a coefficient

In general, the above-mentioned free-formed surface does not have a symmetrical plane for both the X-Z plane and the Y-Z plane. However, by bringing all odd-number order terms of X to 0, a free-formed surface having only one symmetrical plane parallel to the Y-Z plane is obtained. Such a free-formed surface can be attained, for example, in Equation (8), by bringing individual coefficients of $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . to 0. In the present invention also, the free-formed surface having only one symmetrical plane can be used.

By bringing all odd-number order terms of Y to 0, a free-formed surface having only one symmetrical plane parallel to the X-Z plane is obtained. Such a free-formed surface can be attained, for example, in Equation (8), by bringing individual coefficients of $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . to 0.

The symmetrical plane is set in one direction so that decentration in a direction corresponding thereto, for example, the decentration of the optical system relative to a symmetrical plane parallel with the Y-Z plane is set in the direction of the Y axis and that relative to a symmetrical plane parallel with the X-Z plane is set in the direction of the X axis. By doing so, it becomes possible to effectively correct rotational-asymmetrical aberration produced by the decentration and at the same time, to improve productivity.

Equation (7) is cited as an example, as mentioned above. It is thus needless to say that even when the free-formed surface is defined by any equation other than Equation (7), it brings about the same effect as in the above description.

In the present invention, the reflecting surface can be configured as a plane-symmetrical free-formed surface that has only one symmetrical plane. As an example of this reflecting surface, a reflecting surface provided in a prism is cited.

Figure 31:
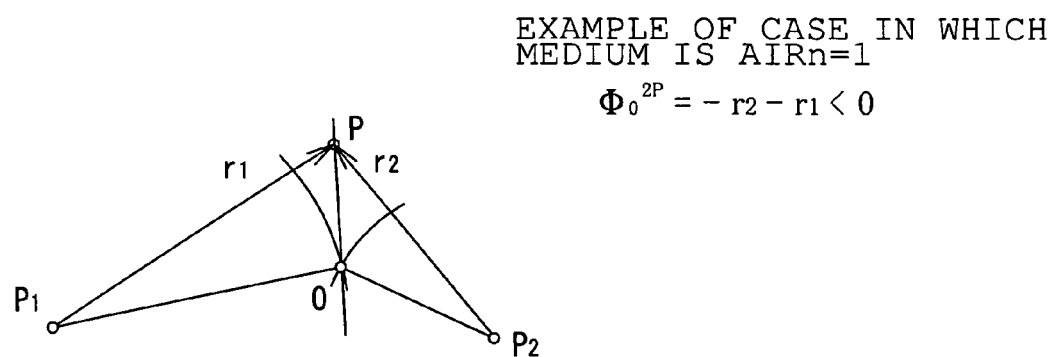
FIG. 31 is a principle view for defining the HOE in the present invention.

The HOE used in the present invention is defined as described below. FIG. 31 shows a principle for the definition of the HOE used in the present invention.

Ray tracing relative to a ray that enters and leaves the HOE can be performed on the basis of the following equation:

$$n_d Q_d \cdot N = n_i Q_i \cdot N + m(\lambda/\lambda_0) \nabla \Phi_0 \cdot N \quad (9)$$

where N is a normal vector of the surface of the HOE, $\lambda$ is the wavelength of the ray; $\lambda_0$(=HWL) is a reference wavelength; $n_i$ and $n_d$ are refractive indices of the entrance side and the exit side, respectively; $Q_i$ and $Q_d$ are an incident light vector and an emergent light vector, respectively, expressed by vectors; m(=HOR) is the order of diffraction of emergent light; and $\Phi_0$ is a path difference function of the surface of the HOE defined with respect to the reference wavelength $\lambda_0$.

As shown in FIG. 31, it is assumed that the HOE is fabricated (defined) by the interference of light emitted from two point light sources $P_1$ and $P_2$ (the reference wavelength $\lambda_0$). Here, light from the point $P_1$=(HX1, HY1, HZ1) is object light, while light from the point $P_2=(HX2, HY2, HZ2)$ is reference light. In this case, the path difference function is given by $$\Phi_0 = \Phi_0^{2P}$$
$$= n_2 \cdot s_2 \cdot r_2 - n_1 \cdot s_1 \cdot r_1$$

where $r_1$ is a distance (>0) from the point $P_1$ to preset coordinates of the surface of the HOE, $r_2$ is a distance (>0) from the point $P_2$ to preset coordinates of the surface of the HOE, $n_1$ is a refractive index on the side on which the point $P_1$ is located with respect to the HOE when fabricated (defined), $n_2$ is a refractive index on the side on which the point $P_2$ is located with respect to the HOE when fabricated (defined), and $s_1$=HV1 and $s_2$=HV2 are signs that consider traveling directions of light. Each of the signs become REA=+1 when the light source is a divergent light source (a real point light source), and VIR=−1 when the light source is a convergent light source (a virtual point light source).

In a general case, the reference light and the object light where the HOE is fabricated are not necessarily plane waves. The path difference function $\Phi_0$ of the HOE in this case, adding an additional phase term $\Phi_0^{Poly}$ (the path difference function at the reference wavelength $\lambda_0$) indicated by a polynomial, can be expressed as $$\Phi_0 = \Phi_0^{2P} + \Phi_0^{Poly} \quad (10)$$

Here, the polynomial is given by $$\Phi_0^{Poly} = = \sum_j H_j \cdot x^m \cdot y^n$$
$$= H_1 x + H_2 y + H_3 x^2 + H_4 xy + H_5 y^2 +$$
$$H_6 x^3 + H_7 x^2 y + H_8 xy^2 + H_9 y^3 + \ldots$$

and in general, it can be defined by $$j = \{(m+n)^2 + m + 3n\}/2$$

where $H_j$ is a coefficient in each term.

For convenience of optical design, the path difference function $\Phi_0$ is expressed by only the additional term as $$\Phi_0 = \Phi_0^{Poly}$$

and thereby the HOE can also be defined. For example, when two point light sources (points $P_1$ and $P_2$) are made to coincide with each other, a component $\Phi_0^{2P}$ due to the interference of the path difference function $\Phi_0$ becomes zero. This case, therefore, corresponds to the fact that the path difference function is substantially indicated by only the additional term (the polynomial).

The above description of the HOE is related to the local coordinate system on the basis of the origin of the HOE.

Examples of component parameters defining the HOE are shown below.

| Face number | Radius of curvature | Spacing |
|---|---|---|
| Object surface | ∞ | ∞ |
| Stop | ∞ | 100 |

| Face number | Radius of curvature | Spacing |
|---|---|---|
| 2 | 150 | −75 |

Figure 32:
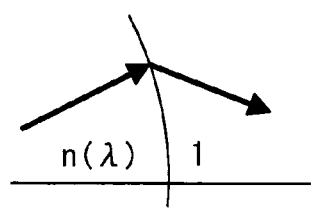
FIG. 32 is an explanatory view for a local power of the HOE in the present invention.

HOE:
HV1 ($s_1$) = REA (+1)
HV2 (s2) = VIR (−1)
HOR (m) = 1
HX1 = 0, HY1 = −3.40 × $10^9$, HZ1 = −3.40 × $10^9$,
HX2 = 0, HY2 = 2.50 × 10, HZ2 = −7.04 × 10,
HWL ($\lambda_0$) = 544
H1 = −1.39 × $10^{-21}$, H2 = −8.57 × $10^{-5}$, H3 = −1.50 × $10^{-4}$, Next, reference is made to the local power of the surface of the HOE. FIG. 32 illustrates the local power of the HOE in the present invention.

The HOE can be expressed by an ultra-high index lens in which a refractive index n goes to infinity (the Sweatt model). When the HOE defined by the path difference function $\Phi_0$ at the wavelength $\lambda_0$ is expressed by the ultra-high index lens, the amount of sag S (x, y), at an interface with air (n=1) such as that shown in FIG. 32, is given as $$S(x,y) \cdot (n(\lambda)-1) = m(\lambda/\lambda_0)\Phi_0$$

A local curvature Cx (curvature cut by a plane containing a surface normal and the x axis) of a surface that the amount of sag is given by S (x, y) is generally expressed as $$Cx = (\partial^2 S/\partial x^2)/[\{1+(\partial S/\partial x)^2+(\partial S/\partial y)^2\}^{1/2} \cdot \{1+(\partial S/\partial x)^2\}]$$

On the other hand, the power in this case (the refracting power of an x component) is expressed as $$1/f_x = -(n(\lambda)-1) \cdot C_x$$

Thus, the refractive index n is brought to infinity and thereby the following equation is obtained as the power of the x component of the HOE.

$$\phi_x = 1/f_x = -m(\lambda/\lambda_0)(\partial^2 \Phi_0/\partial x^2)$$

Similarly, the following equation is obtained as the power of the y component of the HOE.

$$\phi_y = 1/f_y = -m(\lambda/\lambda_0)(\partial^2 \Phi_0/\partial y^2)$$

Subsequently, a description is given of how to find the focal length of the entire system.

A ray of light parallel to the optical axis is rendered incident from the object side of the optical system, from the position of a height of approximately 0.01 mm from the optical axis in the X direction. Then, an angle made by the ray emerging from the optical system with the axial principal ray in the X direction is found and a numerical aperture $NA_{ix}$ is derived from this angle. A fraction $0.01/NA_{ix}$ is determined as a focal length $FX=1/\phi_x$ in the X direction. Likewise, a ray of light parallel to the optical axis is rendered incident from the object side, from the position of a height of approximately 0.01 mm from the optical axis in the Y direction. Then, an angle made by the ray emerging from the optical system with the axial principal ray in the Y direction is found and a numerical aperture $NA_{iy}$ is derived from this angle. A fraction $0.01/NA_{iy}$ is determined as a focal length $FY=1/\phi_y$ in the X direction.

Also, in the present invention, it is desirable to cover the HOE with a dust-proof member.

Some of materials of HOEs have hygroscopic functions. Therefore, if the HOE is exposed to the atmosphere, there is the fear that the HOE absorbs moisture and expands. In this case, the peak wavelength of diffraction efficiency is changed, and diffraction power is liable to be adversely affected. Thus, in order to prevent this, it is desirable to cover the HOE with a dust-proof member. Also, the entire observation optical system may be covered with the dust-proof member. It is desirable that the dust-proof member is provided with a box covering the outside and a transparent cover through which light enters and leaves the box. In this case, it is desirable that the transparent cover is constructed of material such as glass or plastic. On the inside of the dust-proof member, the HOE may be provided to the surface of the transparent cover, with this surface as a substrate. When the dust-proof member is constructed in such a manner, it can be prevented that dust particles are magnified and observed. Furthermore, it is avoidable that the HOB is expanded by the absorption of moisture and the peak wavelength of diffraction is changed.

The observation optical system mentioned above is used as an eyepiece optical system, and thereby a head mounted image display apparatus can be constructed. In this case, the head mounted image display apparatus comprises an image display element, a body section in which the observation optical system is placed, and a supporting member. Also, the supporting member is such as to mount the display apparatus on the viewer's temples in order to hold the body section to the viewer's face.

In this case, the observation optical system and spectacle lenses may be provided integrally with the body section. Alternatively, the supporting member may be constructed so that it can be mounted to, and dismounted from, the temple frames of spectacles.

The observation optical system may be provided to each of the spectacles. By doing so, a head mounted image display apparatus for both eyes can be constructed.

In accordance with the drawings, the embodiments of the present invention will be described below.

In each of the embodiments, for example, in FIG. 1, an axial principal ray 2 is defined as a ray of light that emerging from the center of an exit pupil 1 (the position of the center of rotation of the viewer's eye), through an optical member such as a prism 3, and reaches the center of an LCD 5 provided as an image display element. An optical axis defined by a straight line ranging from the exit pupil 1 to a point of intersection of the axial principal ray 2 with the entrance surface of the prism 3 that is the first optical member is taken as the Z axis; an axis, perpendicular to the Z axis, lying in a decentering plane of each of surfaces constituting the prism 3 is defined as the Y axis, and an axis perpendicular to the optical axis and the Y axis is defined as the X axis. The center of the exit pupil 1 is taken as the origin of the coordinate system. The direction along which the axial principal ray 2 emerges from the exit pupil 1 and reaches the LCD 5 is defined as the positive direction of the Z axis, the direction of the Y axis along which the ray is directed toward the LCD 5 is defined as the positive direction of the Y axis, and the direction of the X axis constituting the right-handed coordinate system with the Y axis and the Z axis is defined as the positive direction of the X axis.

Also, the axial principal ray 2 that emerges from the exit pupil 1 and reaches the prism 3 can be thought of as the optical axis. Thus, when the ray is rendered incident in parallel with this optical axis and traced, the focal length of the entire system mentioned above can be found.

In each embodiment of the present invention, the prism 3 is decentered in the Y-Z plane. The prism 3 is provided with a rotational-asymmetrical surface, and in each embodiment, only one symmetrical plane of the rotational-asymmetrical surface is the Y-Z plane.

The decentering plane has the amount of decentration at the vertex of this surface (the directions of X, Y, and Z axes are denoted by X, Y, and Z, respectively) from the origin of the corresponding coordinate system and inclination angles ($\alpha$, $\beta$, and $\gamma(°)$), with X, Y, and Z axes as centers, of the center axis of the surface (the Z axis of Equation (7) in the free-formed surface). In this case, the plus sign of each of the angles $\alpha$ and $\beta$ indicates a counterclockwise direction with respect to the positive direction of each axis, and the plus sign of the angle $\gamma$ indicates a clockwise direction with respect to the positive direction of the Z axis. Also, the radius of curvature of a spherical surface, the face-to-face spacing, the refractive index of a medium, and the Abbe's number are given by a common practice.

The configuration of the free-formed surface used in the present invention is defined by Equation (7), and the Z axis of this equation corresponds to the axis of the free-formed surface.

The observation optical systems and traverse aberration characteristics of the embodiments of the present invention are shown in FIGS. 1-12L. The observation optical system of each embodiment has the image display element and the eyepiece optical system. In each embodiment of the present invention, the LCD 5 is used as the image display element. The eyepiece optical system is an optical system for forming the exit pupil 1. The eyepiece optical system conducts an image formed by the LCD 5 to the center of the viewer's eye so that the image can be observed as a virtual image. In this case, an intermediate image is not formed. The eyepiece optical system includes the prism 3 with positive refracting power and the HOE closely adhered to the free-formed surface of the prism 3.

Also, in the description of each embodiment, the ray of light is traced (reverse ray tracing) in order of the face number of the optical system, from the exit pupil 1 to the LCD 5, and the order of individual surfaces of the prism 3 is determined in accordance with the reverse ray tracing.

In the figures showing the traverse aberration characteristics of the observation optical systems in the embodiments, FIGS. 2A, 4A, 6A, 8A, 10A, and 12A show traverse aberration characteristics in the Y direction of the principal ray passing through the optical system where an angle of view in the X direction is zero and an angle of view in the Y direction is zero; FIGS. 2B, 4B, 6B, 8B, 10B, and 12B show traverse aberration characteristics in the X direction of the principal ray passing through the optical system where the angle of view in the X direction is zero and the angle of view in the Y direction is zero; FIGS. 2C, 4C, 6C, 8C, 10C, and 12C show traverse aberration characteristics in the Y direction of the principal ray passing through the optical system where the angle of view in the X direction is zero and the angle of view in the negative Y direction is maximum; FIGS. 2D, 4D, 6D, 8D, 10D, and 12D show traverse aberration characteristics in the X direction of the principal ray passing through the optical system where the angle of view in the X direction is zero and the angle of view in the negative Y direction is maximum; FIGS. 2E, 4E, 6E, 8E, 10E, and 12E show traverse aberration characteristics in the Y direction of the principal ray passing through the optical system where the angle of view in the positive X direction is maximum and the angle of view in the negative Y direction is maximum; FIGS. 2F, 4F, 6F, 8F, 10F, and 12F show traverse aberration characteristics in the X direction of the principal ray passing through the optical system where the angle of view in the positive X direction is maximum and the angle of view in the negative Y direction is maximum; FIGS. 2G, 4G, 6G, 8G, 10G, and 12G show traverse aberration characteristics in the Y direction of the principal ray passing through the optical system where the angle of view in the positive X direction is maximum and the angle of view in the Y direction is zero; FIGS. 2H, 4H, 6H, 8H, 10H, and 12H show traverse aberration characteristics in the X direction of the principal ray passing through the optical system where the angle of view in the positive X direction is maximum and the angle of view in the Y direction is zero; FIGS. 2I, 4I, 6I, 8I, 10I, and 12I show traverse aberration characteristics in the Y direction of the principal ray passing through the optical system where the angle of view in the positive X direction is maximum and the angle of view in the positive Y direction is maximum; FIGS. 2J, 4J, 6J, 8J, 10J, and 12J show traverse aberration characteristics in the X direction of the principal ray passing through the optical system where the angle of view in the positive X direction is maximum and the angle of view in the positive Y direction is maximum; FIGS. 2K, 4K, 6K, 8K, 10K, and 12K show traverse aberration characteristics in the Y direction of the principal ray passing through the optical system where the angle of view in the X direction is zero and the angle of view in the positive Y direction is maximum; and FIGS. 2L, 4L, 6L, 8L, 10L, and 12L show traverse aberration characteristics in the X direction of the principal ray passing through the optical system where the angle of view in the X direction is zero and the angle of view in the positive Y direction is maximum. In the observation optical system of each embodiment, the HOE may be constructed so that three layers for R, G, and B are cemented to one another and a color image can be observed.

Embodiment 1

FIG. 1 shows the observation optical system of Embodiment 1 in the present invention. FIGS. 2A-2L show traverse aberration characteristics of the observation optical system of Embodiment 1.

The observation optical system of Embodiment 1 comprises the prism 3, a reflection-type HOE 4, and the display element 5. The prism 3 includes a first surface $3_1$, a second surface $3_2$, a third surface $3_3$, and a fourth surface $3_4$. The first surface $3_1$ is configured to have a first reflecting surface, a third reflecting surface, and the exit surface at different places on the same surface. The second surface $3_2$ is configured into the shape of a rotational-asymmetrical free-formed surface, to which the reflection-type HOE 4 is adhered, and is configured as a fourth reflecting surface. The third surface $3_3$ is configured as a second reflecting surface. The fourth surface $3_4$ is the entrance surface. The HOE 4 is placed on the optical axis (the visual axis) extending linearly from the exit pupil 1.

In this embodiment, light emanating from the display element 5 is incident on the prism and refracted through the fourth surface $3_4$ of the prism. Subsequently, incident light is reflected by the first reflecting surface situated on the first surface $3_1$, and after being reflected by the third surface $3_3$ and the third reflecting surface situated on the first surface $3_1$, reaches the second surface $3_2$. The light is then diffracted and reflected by the HOE 4 adhered to the second surface $3_2$ and is refracted through the exit surface situated on the first surface $3_1$ to emerge from the prism. The light emerging from the prism reaches the exit pupil 1 without forming an image midway between the prism and the exit pupil. When the viewer focuses his eye on the exit pupil 1, a projected image displayed on the display element 5 is formed on the retina of the eye. As a result, the viewer is capable of observing the image displayed on the display element 5.

Subsequently, numerical data of optical members constituting the observation optical system of Embodiment 1 are shown below. In the numerical data, "FFS" stands for the free-formed surface. "FFS" is also applied to the embodiments to be described later.

Numerical Data 1

Total angle of view: 12.0° in the X direction, 9.0° in the Y direction

Pupil diameter: 4 mm

HOE exposure wavelength: 532 nm

| Face number | Radius of curvature | Face-to-face spacing | Decentration | Refractive index | Abbe's number |
|---|---|---|---|---|---|
| Object surface | ∞ | −1000.00 | | | |
| 1 | Stop surface | 0.00 | | | |
| 2 | ∞ | 0.00 | Decentration (1) | 1.5091 | 56.2 |
| 3 | FFS [1] | 0.00 | Decentration (2) | 1.5091 | 56.2 |
| | | | | | HOE[1] |
| 4 | ∞ | 0.00 | Decentration (1) | 1.5091 | 56.2 |
| 5 | ∞ | 0.00 | Decentration (3) | 1.5091 | 56.2 |
| 6 | ∞ | 0.00 | Decentration (1) | 1.5091 | 56.2 |
| 7 | ∞ | 0.00 | Decentration (4) | | |
| Image plane | ∞ | 0.00 | Decentration (5) | | |

FFS [1]

$C4 = -6.5039 \times 10^{-3}$  $C6 = -6.1495 \times 10^{-3}$  $C8 = -1.7531 \times 10^{-5}$
$C10 = 4.6048 \times 10^{-6}$  $C11 = -3.7049 \times 10^{-5}$  $C13 = -2.3993 \times 10^{-5}$
$C15 = -1.8978 \times 10^{-6}$ Decentration [1]

| | | |
|---|---|---|
| X = 0.00 | Y = 0.00 | Z = 25.00 |
| α = 0.00 | β = 0.00 | γ = 0.00 |

Decentration [2]

| | | |
|---|---|---|
| X = 0.00 | Y = 0.00 | Z = 28.13 |
| α = −25.76 | β = 0.00 | γ = 0.00 |

Decentration [3]

| | | |
|---|---|---|
| X = 0.00 | Y = 0.00 | Z = 30.00 |
| α = 0.00 | β = 0.00 | γ = 0.00 |

Decentration [4]

| | | |
|---|---|---|
| X = 0.00 | Y = 20.30 | Z = 28.06 |
| α = 68.69 | β = 0.00 | γ = 0.00 |

Decentration [5]

| | | |
|---|---|---|
| X = 0.00 | Y = 24.10 | Z = 32.29 |
| α = 31.22 | β = 0.00 | γ = 0.00 |

HOE [1]

HV1 = REA   HV2 = REA   HOR = 1
HX1 = 0    HY1 = 0    HZ1 = 0
HX2 = 0    HY2 = 0    HZ2 = 0
HWL = 532.00
$H\,2 = -2.5341 \times 10^{-3}$  $H\,3 = -3.6769 \times 10^{-3}$  $H\,5 = 1.5015 \times 10^{-5}$
$H\,7 = 1.2265 \times 10^{-4}$  $H\,9 = 4.2600 \times 10^{-5}$  $H10 = 9.9120 \times 10^{-5}$
$H12 = 6.2356 \times 10^{-5}$  $H14 = 4.3353 \times 10^{-6}$  $H16 = -1.4129 \times 10^{-6}$
$H18 = 3.5841 \times 10^{-7}$  $H20 = -3.7224 \times 10^{-7}$ Embodiment 2

Figure 3:
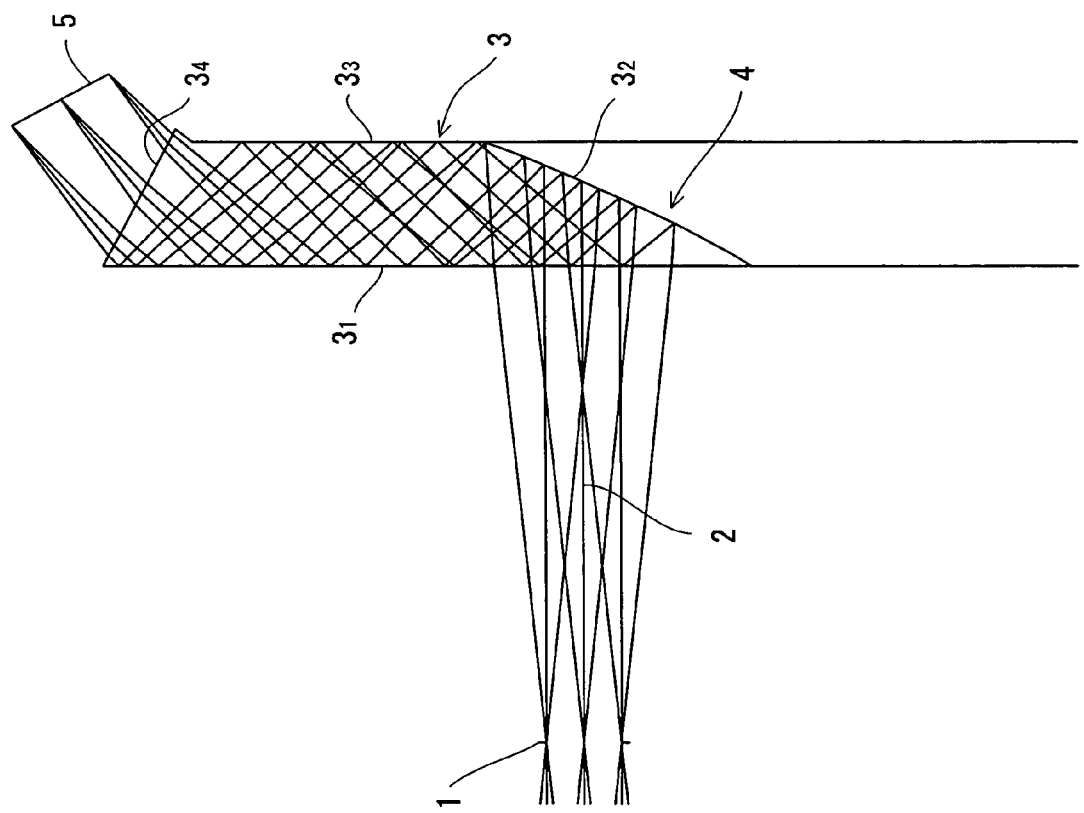
FIG. 3 is a Y-Z sectional view including the optical axis of the observation optical system of Embodiment 2 in the present invention.
Figure 4:
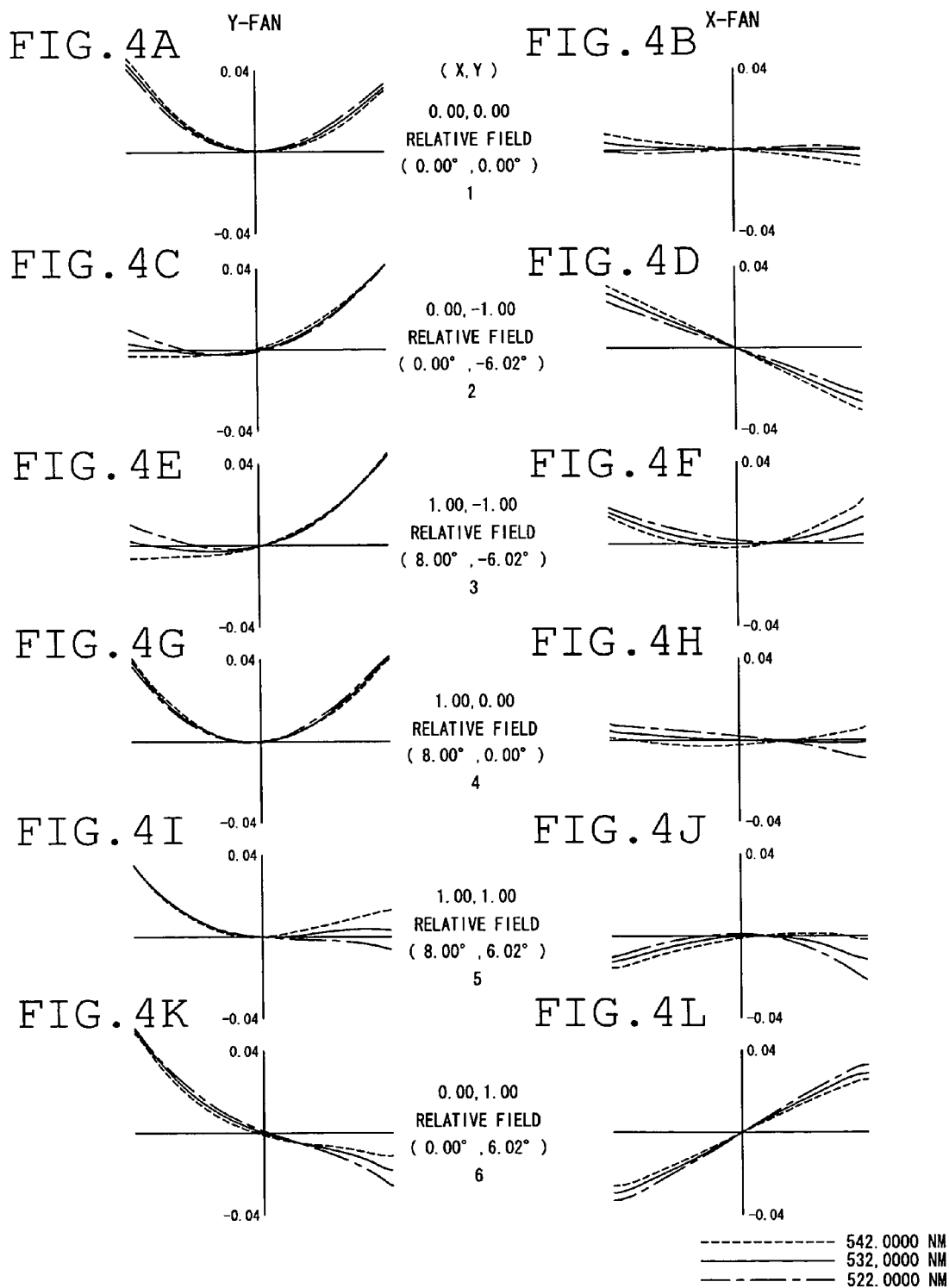
FIGS. 4A-4L are diagrams showing transverse aberration characteristics of the observation optical system of Embodiment 2.

FIG. 3 shows the observation optical system of Embodiment 2 in the present invention. FIGS. 4A-4L show traverse aberration characteristics of the observation optical system of Embodiment 2.

The fundamental arrangement of the observation optical system of Embodiment 2 is almost the same as that of the observation optical system of Embodiment 1.

Subsequently, numerical data of optical members constituting the observation optical system of Embodiment 2 are shown below.

Numerical Data 2

Total angle of view: 16.0° in the X direction, 12.0° in the Y direction
Pupil diameter: 4 mm
HOE exposure wavelength: 532 nm

| Face number | Radius of curvature | Face-to-face spacing | Decentration | Refractive index | Abbe's number |
|---|---|---|---|---|---|
| Object surface | ∞ | −1000.00 | | | |
| 1 | Stop surface | 0.00 | | | |
| 2 | ∞ | 0.00 | Decentration (1) | 1.5091 | 56.2 |
| 3 | FFS [1] | 0.00 | Decentration (2) | 1.5091 | 56.2 HOE[1] |
| 4 | ∞ | 0.00 | Decentration (1) | 1.5091 | 56.2 |
| 5 | ∞ | 0.00 | Decentration (3) | 1.5091 | 56.2 |
| 6 | ∞ | 0.00 | Decentration (1) | 1.5091 | 56.2 |
| 7 | ∞ | 0.00 | Decentration (4) | | |
| Image plane | ∞ | 0.00 | Decentration (5) | | |

FFS [1]

$C4 = -5.5770 \times 10^{-3}$  $C6 = -4.7844 \times 10^{-3}$  $C8 = 2.1431 \times 10^{-5}$
$C10 = 1.3883 \times 10^{-5}$  $C11 = -1.9038 \times 10^{-5}$  $C13 = -8.8970 \times 10^{-6}$
$C15 = -1.5285 \times 10^{-5}$ Decentration [1]

X = 0.00   Y = 0.00   Z = 25.00
α = 0.00   β = 0.00   γ = 0.00

Decentration [2]

X = 0.00   Y = 0.00   Z = 29.48
α = −23.49   β = 0.00   γ = 0.00

Decentration [3]

X = 0.00   Y = 0.00   Z = 31.50
α = 0.00   β = 0.00   γ = 0.00

Decentration [4]

X = 0.00   Y = 22.71   Z = 28.78
α = 61.69   β = 0.00   γ = 0.00

Decentration [5]

X = 0.00   Y = 26.74   Z = 33.78
α = 27.82   β = 0.00   γ = 0.00

HOE [1]

HV1 = REA   HV2 = REA   HOR = 1
HX1 = 0   HY1 = 0   HZ1 = 0
HX2 = 0   HY2 = 0   HZ2 = 0
HWL = 532.00
$H2 = -2.2895 \times 10^{-3}$   $H3 = -2.5394 \times 10^{-3}$   $H5 = -1.5469 \times 10^{-3}$
$H7 = 3.2574 \times 10^{-5}$   $H9 = 1.2352 \times 10^{-5}$   $H10 = 5.1491 \times 10^{-5}$
$H12 = 2.3645 \times 10^{-5}$   $H14 = 4.1348 \times 10^{-5}$   $H16 = -1.1004 \times 10^{-6}$
$H18 = 4.5145 \times 10^{-7}$   $H20 = -3.8698 \times 10^{-7}$ Embodiment 3

Figure 5:
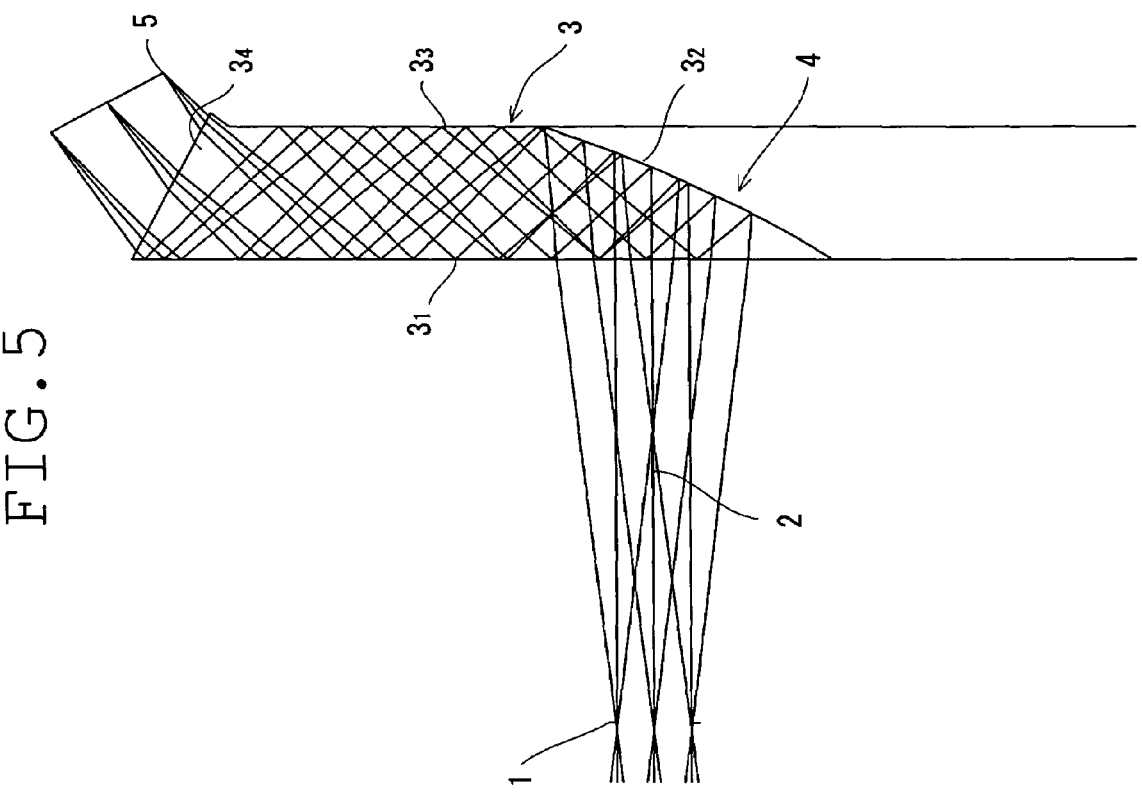
FIG. 5 is a Y-Z sectional view including the optical axis of the observation optical system of Embodiment 3 in the present invention.
Figure 6:
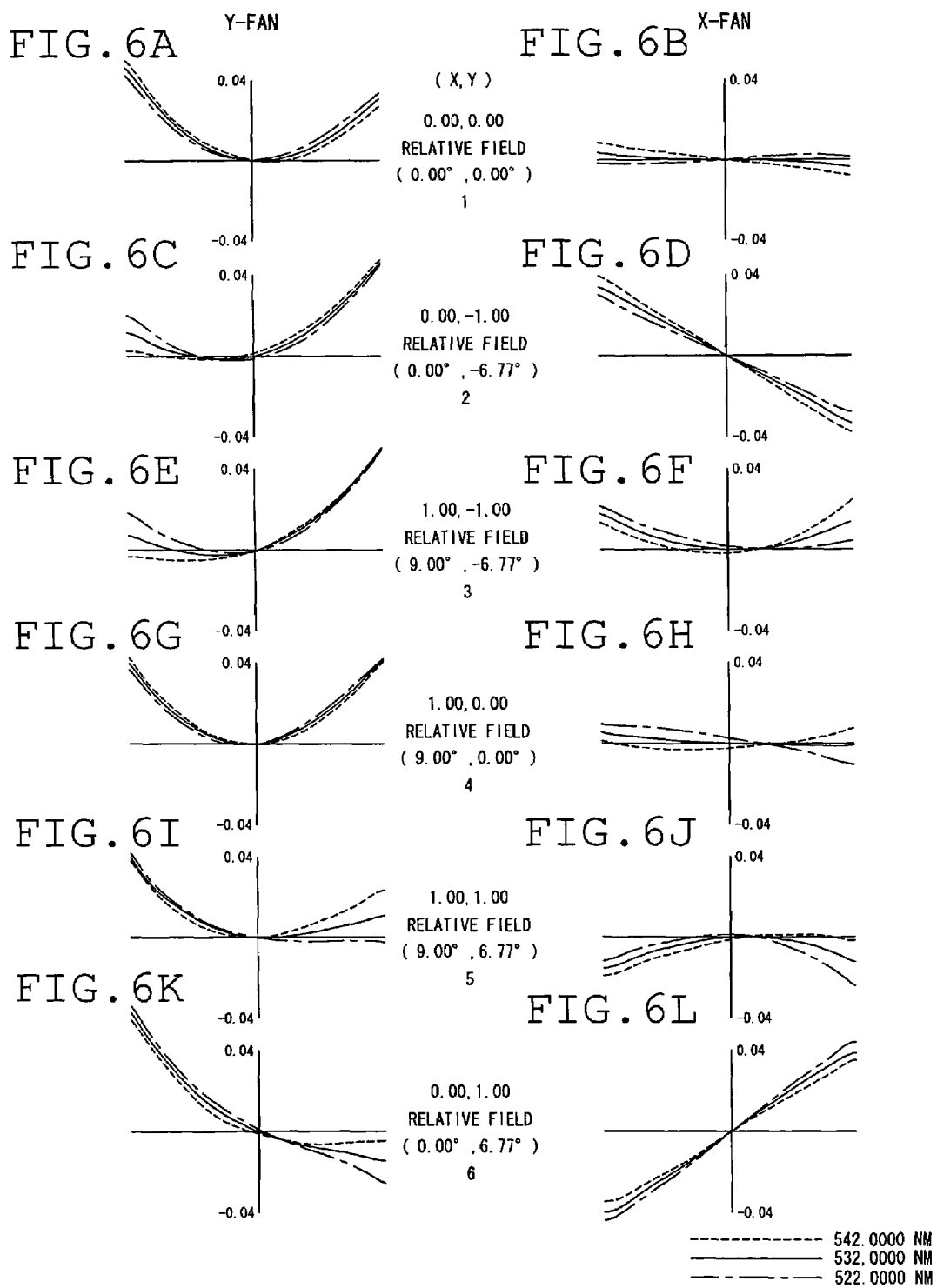
FIGS. 6A-6L are diagrams showing transverse aberration characteristics of the observation optical system of Embodiment 3.

FIG. 5 shows the observation optical system of Embodiment 3 in the present invention. FIGS. 6A-6L show traverse aberration characteristics of the observation optical system of Embodiment 3.

The fundamental arrangement of the observation optical system of Embodiment 3 is almost the same as that of the observation optical system of Embodiment 1.

Subsequently, numerical data of optical members constituting the observation optical system of Embodiment 3 are shown below.

Numerical Data 3

Total angle of view: 18.0° in the X direction, 13.5° in the Y direction
Pupil diameter: 4 mm
HOE exposure wavelength: 532 nm

| Face number | Radius of curvature | Face-to-face spacing | Decentration | Refractive index | Abbe's number |
|---|---|---|---|---|---|
| Object surface | ∞ | −1000.00 | | | |
| 1 | Stop surface | 0.00 | | | |
| 2 | ∞ | 0.00 | Decentration (1) | 1.5091 | 56.2 |
| 3 | FFS [1] | 0.00 | Decentration (2) | 1.5091 | 56.2 HOE[1] |
| 4 | ∞ | 0.00 | Decentration (1) | 1.5091 | 56.2 |
| 5 | ∞ | 0.00 | Decentration (3) | 1.5091 | 56.2 |
| 6 | ∞ | 0.00 | Decentration (1) | 1.5091 | 56.2 |
| 7 | ∞ | 0.00 | Decentration (4) | | |
| Image plane | ∞ | 0.00 | Decentration (5) | | |

FFS [1]

$C4 = -5.2658 \times 10^{-3}$  $C6 = -4.5059 \times 10^{-3}$  $C8 = 2.5121 \times 10^{-5}$
$C10 = 1.1062 \times 10^{-5}$  $C11 = -1.8001 \times 10^{-5}$  $C13 = -7.6927 \times 10^{-6}$
$C15 = -1.7000 \times 10^{-5}$ Decentration [1]

X = 0.00   Y = 0.00   Z = 25.00
α = 0.00   β = 0.00   γ = 0.00

Decentration [2]

X = 0.00   Y = 0.00   Z = 29.80
α = −23.63   β = 0.00   γ = 0.00

Decentration [3]

X = 0.00   Y = 0.00   Z = 32.00
α = 0.00   β = 0.00   γ = 0.00

Decentration [4]

X = 0.00   Y = 24.67   Z = 29.07
α = 61.05   β = 0.00   γ = 0.00

Decentration [5]

X = 0.00   Y = 28.20   Z = 33.33
α = 28.25   β = 0.00   γ = 0.00

HOE [1]

HV1 = REA   HV2 = REA   HOR = 1
HX1 = 0   HY1 = 0   HZ1 = 0
HX2 = 0   HY2 = 0   HZ2 = 0
HWL = 532.00
$H2 = -1.9563 \times 10^{-3}$   $H3 = -2.8904 \times 10^{-3}$   $H5 = -1.9779 \times 10^{-3}$
$H7 = 2.8587 \times 10^{-5}$   $H9 = 1.0287 \times 10^{-5}$   $H10 = 4.8623 \times 10^{-5}$
$H12 = 2.0414 \times 10^{-5}$   $H14 = 4.6067 \times 10^{-5}$   $H16 = -9.7348 \times 10^{-7}$
$H18 = 3.1609 \times 10^{-7}$   $H20 = -1.8789 \times 10^{-7}$ Embodiment 4

Figure 7:
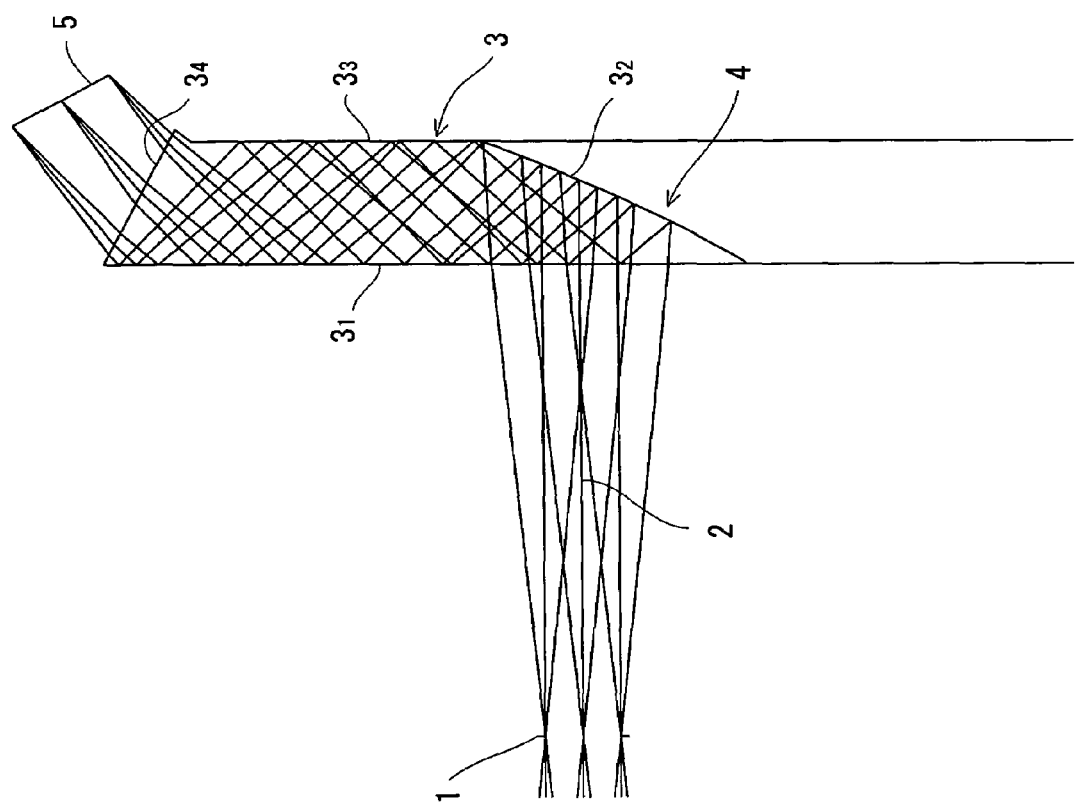
FIG. 7 is a Y-Z sectional view including the optical axis of the observation optical system of Embodiment 4 in the present invention.

FIG. 7 shows the observation optical system of Embodiment 4 in the present invention. FIGS. 8A-8L show traverse aberration characteristics of the observation optical system of Embodiment 4.

The fundamental arrangement of the observation optical system of Embodiment 4 is almost the same as that of the observation optical system of Embodiment 1.

Subsequently, numerical data of optical members constituting the observation optical system of Embodiment 4 are shown below.

Numerical Data 4

Total angle of view: 16.0° in the X direction, 12.0° in the Y direction
Pupil diameter: 4 mm
HOE exposure wavelength: 532 nm

| Face number | Radius of curvature | Face-to-face spacing | Decentration | Refractive index | Abbe's number |
|---|---|---|---|---|---|
| Object surface | ∞ | −1000.00 | | | |
| 1 | Stop surface | 0.00 | | | |
| 2 | ∞ | 0.00 | Decentration (1) | 1.5091 | 56.2 |
| 3 | FFS [1] | 0.00 | Decentration (2) | 1.5091 | 56.2 HOE[1] |
| 4 | ∞ | 0.00 | Decentration (1) | 1.5091 | 56.2 |
| 5 | ∞ | 0.00 | Decentration (3) | 1.5091 | 56.2 |
| 6 | ∞ | 0.00 | Decentration (1) | 1.5091 | 56.2 |
| 7 | ∞ | 0.00 | Decentration (4) | | |
| Image plane | ∞ | 0.00 | Decentration (5) | | |

FFS [1]

$C4 = -7.0566 \times 10^{-3}$  $C6 = -5.8935 \times 10^{-3}$  $C8 = 6.8651 \times 10^{-6}$
$C10 = 5.3674 \times 10^{-6}$  $C11 = 1.8987 \times 10^{-5}$  $C13 = 1.7698 \times 10^{-5}$
$C15 = 1.9560 \times 10^{-5}$ Decentration [1]

$X = 0.00$  $Y = 0.00$  $Z = 25.00$
$\alpha = 0.00$  $\beta = 0.00$  $\gamma = 0.00$ Decentration [2]

$X = 0.00$  $Y = 0.00$  $Z = 29.48$
$\alpha = -23.50$  $\beta = 0.00$  $\gamma = 0.00$ Decentration [3]

$X = 0.00$  $Y = 0.00$  $Z = 31.50$
$\alpha = 0.00$  $\beta = 0.00$  $\gamma = 0.00$ Decentration [4]

$X = 0.00$  $Y = 22.77$  $Z = 28.86$
$\alpha = 62.61$  $\beta = 0.00$  $\gamma = 0.00$ Decentration [5]

$X = 0.00$  $Y = 26.71$  $Z = 33.84$
$\alpha = 26.02$  $\beta = 0.00$  $\gamma = 0.00$

HOE [1]

HV1 = REA  HV2 = REA  HOR = 1
HX1 = 0  HY1 = 0  HZ1 = 0
HX2 = 0  HY2 = 0  HZ2 = 0
HWL = 532.00
$H2 = -3.6986 \times 10^{-3}$  $H3 = 1.5469 \times 10^{-3}$  $H5 = 1.5469 \times 10^{-3}$
$H7 = 6.0367 \times 10^{-5}$  $H9 = 5.6796 \times 10^{-5}$  $H10 = -5.3750 \times 10^{-5}$
$H12 = -5.0271 \times 10^{-5}$  $H14 = -5.4609 \times 10^{-5}$  $H16 = -2.8522 \times 10^{-7}$
$H18 = -5.7518 \times 10^{-8}$  $H20 = -4.4905 \times 10^{-7}$ Embodiment 5

Figure 9:
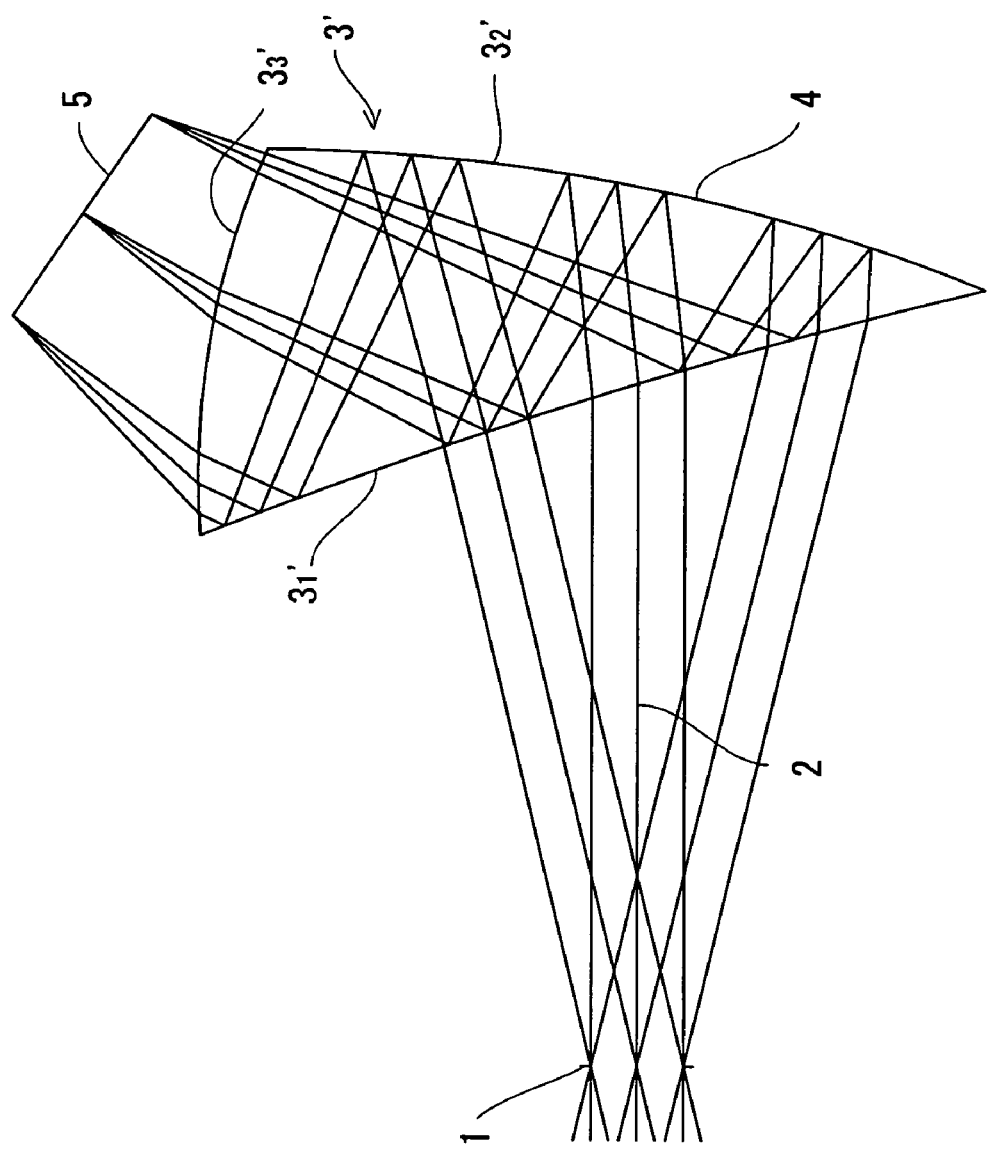
FIG. 9 is a Y-Z sectional view including the optical axis of the observation optical system of Embodiment 5 in the present invention.
Figure 10:
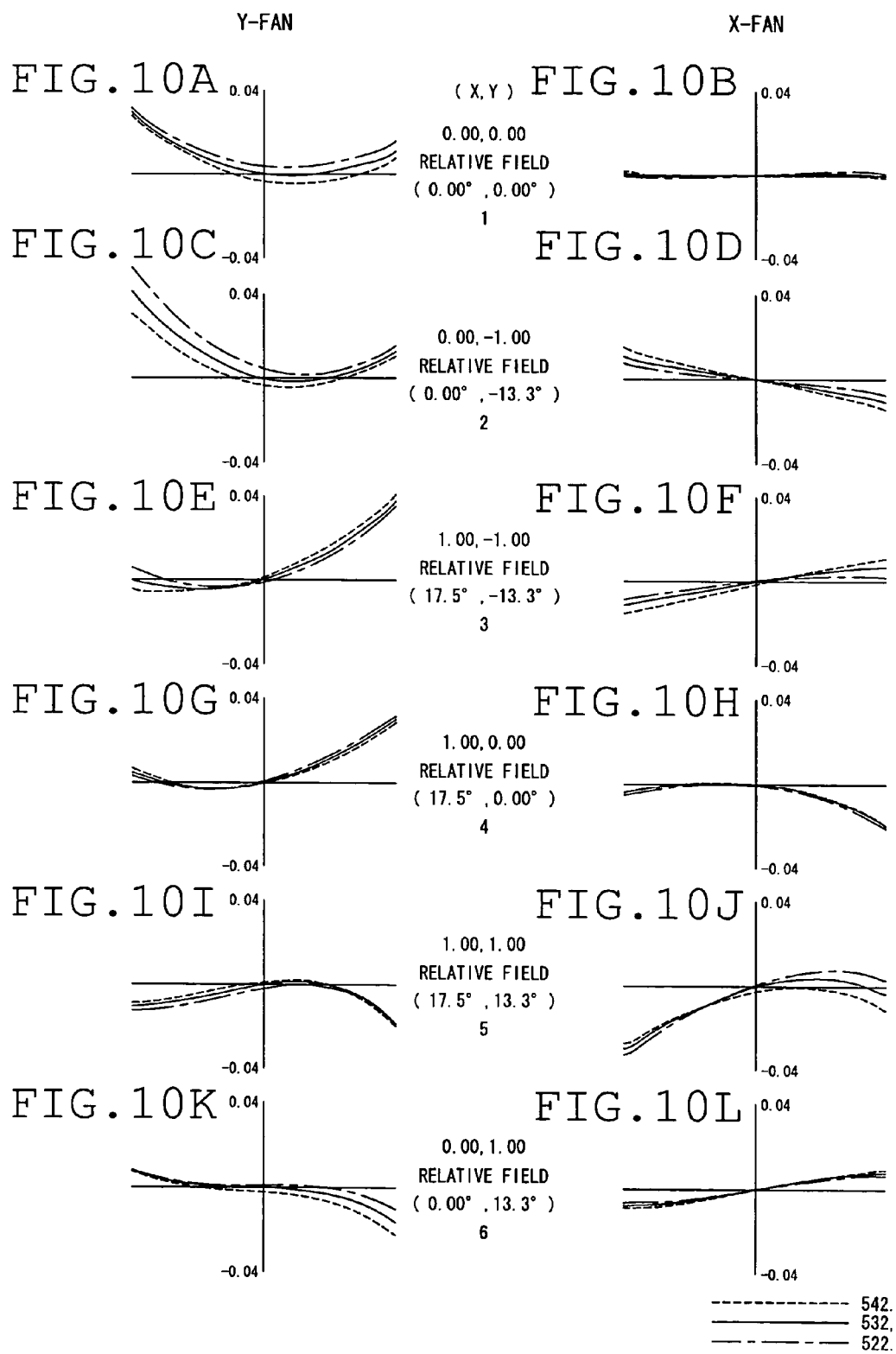
FIGS. 10A-10L are diagrams showing transverse aberration characteristics of the observation optical system of Embodiment 5.

FIG. 9 shows the observation optical system of Embodiment 5 in the present invention. FIGS. 10A-10L show traverse aberration characteristics of the observation optical system of Embodiment 5.

The observation optical system of Embodiment 5 comprises a prism 3', the reflection-type HOE 4, and the display element 5. The prism 3' includes a first surface $3_1'$, a second surface $3_2'$, and a third surface 33'. The first surface $3_1'$ is configured to have a first reflecting surface and the exit surface at different places on the same surface. The second surface $3_2'$ is configured into the shape of a rotational-asymmetrical free-formed surface, to which the reflection-type HOE 4 is adhered, and is configured as a second reflecting surface. The third surface $3_3'$ is configured as the entrance surface. The HOE 4 is placed on the optical axis (the visual axis) extending linearly from the exit pupil 1.

In this embodiment, light emanating from the display element 5 is incident on the prism and refracted through the third surface $3_3'$ of the prism. Subsequently, incident light, after being reflected by the first reflecting surface situated on the first surface $3_1'$, reaches the second surface $3_2'$. The light is then diffracted and reflected by the HOE 4 adhered to the second surface $3_2'$ and is refracted through the exit surface situated on the first surface $3_1'$ to emerge from the prism. The light emerging from the prism reaches the exit pupil 1 without forming an image midway between the prism and the exit pupil. When the viewer focuses his eye on the exit pupil 1, a projected image displayed on the display element 5 is formed on the retina of the eye. As a result, the viewer is capable of observing the image displayed on the display element 5.

Subsequently, numerical data of optical members constituting the observation optical system of Embodiment 5 are shown below.

Numerical Data 5

Total angle of view: 35.0° in the X direction, 26.6° in the Y direction
Pupil diameter: 4 mm
HOE exposure wavelength: 532 nm

| Face number | Radius of curvature | Face-to-face spacing | Decentration | Refractive index | Abbe's number |
|---|---|---|---|---|---|
| Object surface | ∞ | −1000.00 | | | |
| 1 | Stop surface | 0.00 | | | |
| 2 | Aspherical surface [1] | 0.00 | Decentration (1) | 1.5254 | 56.2 |
| 3 | FFS [1] | 0.00 | Decentration (2) | 1.5254 | 56.2 HOE[1] |
| 4 | Aspherical surface [1] | 0.00 | Decentration (1) | 1.5254 | 56.2 |
| 5 | FFS [2] | 0.00 | Decentration (3) | | |
| Image plane | ∞ | 0.00 | Decentration (4) | | |

Aspherical surface [1]

Radius of curvature  −266.72
$k = 0.0000 \times 10^{+0}$
$a = 6.2671 \times 10^{-7}$  $b = -2.9401 \times 10^{-10}$

FFS [1]

$C4 = -7.6284 \times 10^{-3}$  $C6 = -7.3471 \times 10^{-3}$  $C8 = 1.2616 \times 10^{-5}$
$C10 = 2.6287 \times 10^{-5}$  $C11 = -8.7310 \times 10^{-8}$  $C13 = 5.3321 \times 10^{-7}$
$C15 = 7.1052 \times 10^{-7}$  $C17 = 1.2404 \times 10^{-7}$  $C19 = 7.9780 \times 10^{-9}$
$C21 = 1.3510 \times 10^{-7}$

FFS [2]

$C4 = -1.3246 \times 10^{-2}$  $C6 = -1.2140 \times 10^{-2}$  $C8 = 1.5806 \times 10^{-4}$
$C10 = 2.8791 \times 10^{-5}$  $C11 = 1.5165 \times 10^{-5}$  $C13 = 4.9921 \times 10^{-5}$ -continued

C17 = −1.0915 × 10⁻⁶  C19 = −2.4787 × 10⁻⁶

Decentration [1]

| | | |
|---|---|---|
| X = 0.00 | Y = 6.53 | Z = 27.50 |
| α = 18.63 | β = 0.00 | γ = 0.00 |

Decentration [2]

| | | |
|---|---|---|
| X = 0.00 | Y = 0.94 | Z = 38.47 |
| α = −10.47 | β = 0.00 | γ = 0.00 |

Decentration [3]

| | | |
|---|---|---|
| X = 0.00 | Y = 17.95 | Z = 33.01 |
| α = 78.55 | β = 0.00 | γ = 0.00 |

Decentration [4]

| | | |
|---|---|---|
| X = 0.00 | Y = 23.80 | Z = 36.89 |
| α = 56.39 | β = 0.00 | γ = 0.00 |

FFS [1]

| | | |
|---|---|---|
| HV1 = REA | HV2 = REA | HOR = 1 |
| HX1 = 0 | HY1 = 0 | HZ1 = 0 |
| HX2 = 0 | HY2 = 0 | HZ2 = 0 |
| HWL = 532.00 | | |
| H 3 = −4.7263 × 10⁻⁴ | H 5 = −5.3653 × 10⁻⁴ | H 7 = 5.9312 × 10⁻⁵ |
| H 9 = 3.3326 × 10⁻⁵ | H10 = 2.4729 × 10⁻⁷ | H12 = −4.8047 × 10⁻⁷ |
| H14 = 7.3203 × 10⁻⁷ | H16 = −3.0850 × 10⁻⁷ | H18 = 5.3851 × 10⁻⁸ |
| H20 = −2.7544 × 10⁻⁷ | | |

Embodiment 6

Figure 11:
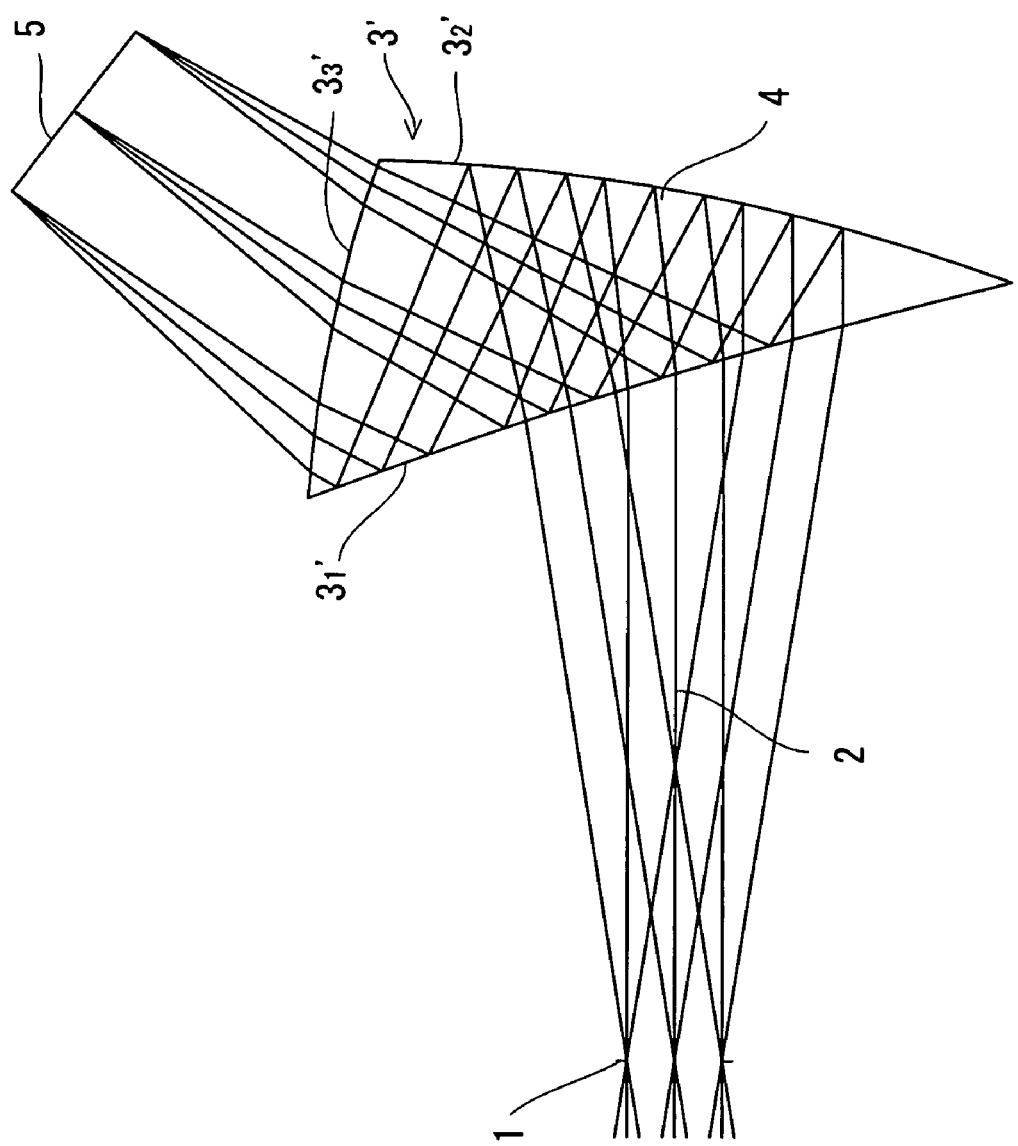
FIG. 11 is a Y-Z sectional view including the optical axis of the observation optical system of Embodiment 6 in the present invention.
Figure 12:
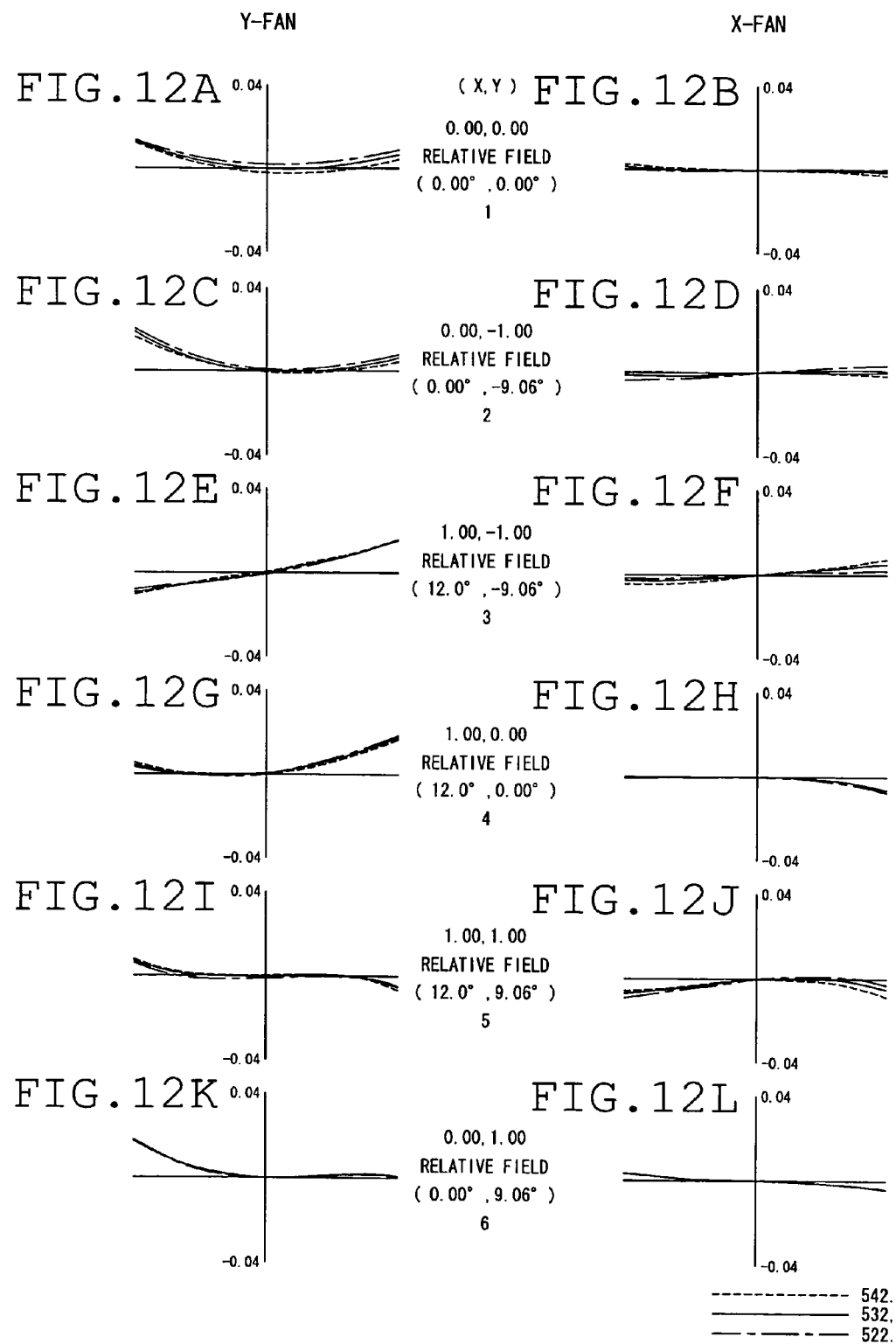
FIGS. 12A-12L are diagrams showing transverse aberration characteristics of the observation optical system of Embodiment 6.

FIG. 11 shows the observation optical system of Embodiment 6 in the present invention. FIGS. 12A-12L show traverse aberration characteristics of the observation optical system of Embodiment 4.

The fundamental arrangement of the observation optical system of Embodiment 6 is almost the same as that of the observation optical system of Embodiment 5.

Subsequently, numerical data of optical members constituting the observation optical system of Embodiment 6 are shown below.

Numerical Data 6
Total angle of view: 24.0° in the X direction, 18.1° in the Y direction
Pupil diameter: 4 mm
HOE exposure wavelength: 532 nm

| Face number | Radius of curvature | Face-to-face spacing | Decentration | Refractive index | Abbe's number |
|---|---|---|---|---|---|
| Object surface | ∞ | −1000.00 | | | |
| 1 | Stop surface | 0.00 | | | |
| 2 | Aspherical surface [1] | 0.00 | Decentration (1) | 1.5254 | 56.2 |
| 3 | FFS [1] | 0.00 | Decentration (2) | 1.5254 | 56.2 HOE[1] |
| 4 | Aspherical surface [1] | 0.00 | Decentration (1) | 1.5254 | 56.2 |
| 5 | FFS [2] | 0.00 | Decentration (3) | | |
| Image plane | ∞ | 0.00 | Decentration (4) | | |

Aspherical surface [1]

| | |
|---|---|
| Radius of curvature | −374.44 |

-continued

| | |
|---|---|
| k = 0.0000 × 10⁺⁰ | |
| a = 2.1288 × 10⁻⁶ | b = −2.4110 × 10⁻⁹ |

FFS [1]

| | | |
|---|---|---|
| C 4 = −6.2690 × 10⁻³ | C 6 = −5.9153 × 10⁻³ | C 8 = 2.2465 × 10⁻⁵ |
| C10 = 3.7253 × 10⁻⁵ | C11 = 1.1579 × 10⁻⁶ | C13 = 3.3460 × 10⁻⁶ |
| C15 = 3.4259 × 10⁻⁶ | C17 = 2.2775 × 10⁻⁷ | C19 = 1.5671 × 10⁻⁷ |
| C21 = 1.6731 × 10⁻⁷ | | |

FFS [2]

| | | |
|---|---|---|
| C 4 = −8.5446 × 10⁻³ | C 6 = −8.2419 × 10⁻³ | C 8 = −1.8084 × 10⁻⁴ |
| C10 = −2.3386 × 10⁻⁴ | C11 = −4.2731 × 10⁻⁶ | C13 = 2.5176 × 10⁻⁵ |
| C17 = −1.8668 × 10⁻⁷ | C19 = −1.5066 × 10⁻⁶ | |

Decentration [1]

| | | |
|---|---|---|
| X = 0.00 | Y = 5.36 | Z = 27.53 |
| α = 18.28 | β = 0.00 | γ = 0.00 |

Decentration [2]

| | | |
|---|---|---|
| X = 0.00 | Y = 0.86 | Z = 37.22 |
| α = −9.39 | β = 0.00 | γ = 0.00 |

Decentration [3]

| | | |
|---|---|---|
| X = 0.00 | Y = 14.15 | Z = 32.30 |
| α = 76.61 | β = 0.00 | γ = 0.00 |

Decentration [4]

| | | |
|---|---|---|
| X = 0.00 | Y = 24.99 | Z = 40.42 |
| α = 53.14 | β = 0.00 | γ = 0.00 |

HOE [1]

| | | |
|---|---|---|
| HV1 = REA | HV2 = REA | HOR = 1 |
| HX1 = 0 | HY1 = 0 | HZ1 = 0 |
| HX2 = 0 | HY2 = 0 | HZ2 = 0 |
| HWL = 532.00 | | |
| H 3 = −5.2413 × 10⁻⁴ | H 5 = −4.9669 × 10⁻⁴ | H 7 = 5.0025 × 10⁻⁵ |
| H 9 = 2.5123 × 10⁻⁵ | H10 = 5.8377 × 10⁻⁷ | H12 = −9.2825 × 10⁻⁷ |
| H14 = 2.3516 × 10⁻⁷ | H16 = −4.9147 × 10⁻⁷ | H18 = −1.5439 × 10⁻⁷ |
| H20 = −3.1012 × 10⁻⁷ | | |

Next, values of parameters of the conditions of the observation optical systems in the above embodiments are shown below.

| | (Embodiment No.) | | | | | |
|---|---|---|---|---|---|---|
| | (1) | (2) | (3) | (4) | (5) | (6) |
| φx/Px | 0.13 | 0.10 | 0.12 | −0.06 | 0.02 | 0.02 |
| φy/Py | 0.00 | 0.06 | 0.08 | −0.06 | 0.02 | 0.02 |
| φx/Φx | 0.19 | 0.15 | 0.18 | −0.07 | 0.02 | 0.03 |
| φy/Φy | 0.00 | 0.11 | 0.15 | −0.09 | 0.02 | 0.03 |
| φmx/Φmx | −0.29 | −0.29 | −0.32 | 1.09 | 0.01 | 0.01 |
| φmy/Φmy | −0.04 | −0.25 | −0.31 | 1.09 | 0.19 | 0.15 |

The prism used in the observation optical system of the present invention is not limited to the type of each embodiment, and may be configured as a prism such as that shown in each of FIGS. 13-23 and 29.

Figure 13:
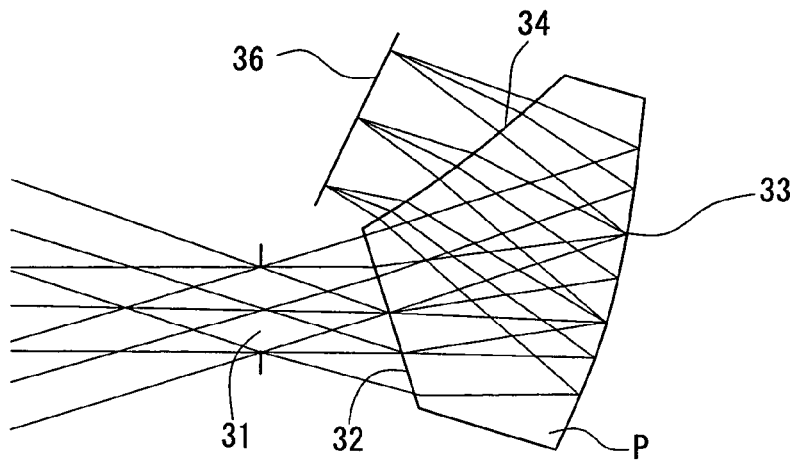
FIG. 13 is a view showing one example of a prism applicable to a prism member of the observation optical system of the present invention.

A prism P shown in FIG. 13 has a first surface 32, a second surface 33, and a third surface 34. Here, the first surface 32 is configured as the exit surface and the third surface 34 is the entrance surface. The second surface 33 is the reflecting surface and has the shape of a rotational-asymmetrical free-formed surface. The HOE is adhered to this free-formed surface.

In this prism P, light emanating from an LCD 36 is refracted through the third surface 34 and enters the prism. Subsequently, this light is diffracted and reflected by the second surface 33 and is refracted through the first surface 32 to emerge from the prism. The viewer focuses his eye on an exit pupil 31, thereby carrying out the observation of a projected image (an image).

Figure 14:
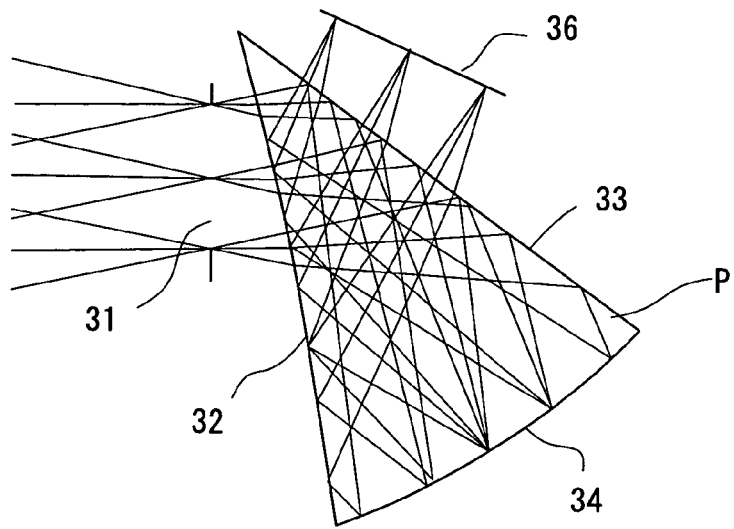
FIG. 14 is a view showing another example of the prism applicable to the prism member of the observation optical system of the present invention.

The prism P of FIG. 14 has the first surface 32, the second surface 33, and the third surface 34. Here, the first surface 32 combines the first reflecting surface with the exit surface. The second surface 33 combines the third reflecting surface with the entrance surface and has the shape of the rotational-asymmetrical free-formed surface. The HOE is adhered to this free-formed surface. The third surface 34 is configured as the second reflecting surface.

In this prism P, light emanating from the LCD 36 is refracted though the second surface 33 and enters the prism. Subsequently, this light is reflected by the first surface 32 and after being further reflected by the third surface 34, reaches the second surface 33. The light is then diffracted and reflected by the second surface 33 and is refracted through the first surface 32 to emerge from the prism. The viewer focuses his eye on the exit pupil 31, thereby making the observation of the projected image (the image).

Figure 15:
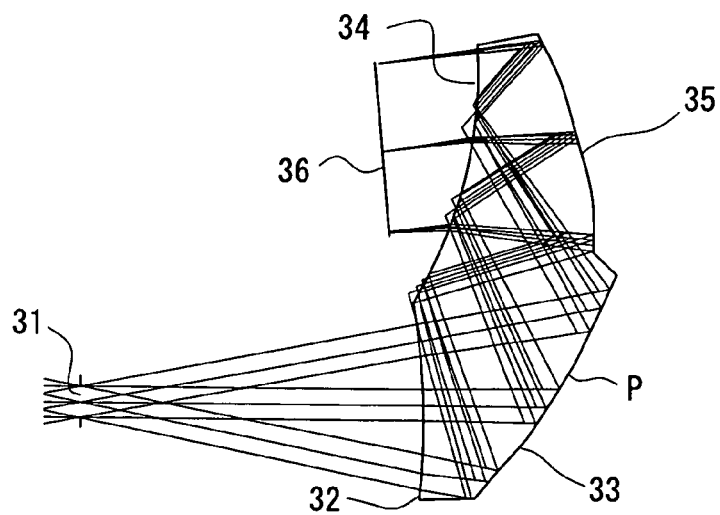
FIG. 15 is a view showing another example of the prism applicable to the prism member of the observation optical system of the present invention.
Figure 16:
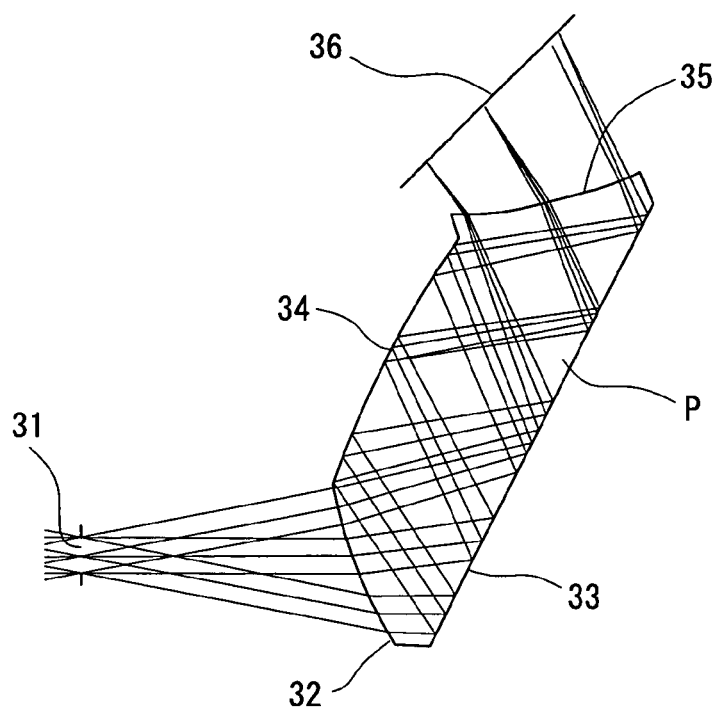
FIG. 16 is a view showing another example of the prism applicable to the prism member of the observation optical system of the present invention.

The prism P of FIG. 15 has the first surface 32, the second surface 33, the third surface 34, and a fourth surface 35. Here, the first surface 32 is configured as the exit surface. The second surface 33 is configured as the third reflecting surface and has the shape of the rotational-asymmetrical free-formed surface. The HOE is adhered to this free-formed surface. The third surface 34 combines the entrance surface with the second reflecting surface. The fourth surface 35 is configured as the first reflecting surface.

In this prism P, light emanating from the LCD 36 is refracted through the third surface 34 and is incident on the prism. Subsequently, this light, after being reflected by the fourth surface 35, is further reflected by the third surface 34 and reaches the second surface 33. The light is then diffracted and reflected by the second surface 33 and is refracted through the first surface 32 to emerge from the prism. The viewer focuses his eye on the exit pupil 31, thereby making the observation of the projected image (the image). The prism P of FIG. 16 has the first surface 32, the second surface 33, the third surface 34, and the fourth surface 35. Here, the first surface 32 is configured as the exit surface. The second surface 33 is configured as the first reflecting surface and the third reflecting surface and has the shape of the rotational-asymmetrical free-formed surface. The first reflecting surface and the third reflecting surface are located at different places on the same surface. The HOE is adhered to the free-formed surface constituting the third reflecting surface. The third surface 34 is configured as the second reflecting surface, and the fourth surface 35 is the entrance surface.

In this prism P, light emanating from the LCD 36 is refracted through the fourth surface 35 and is incident on the prism. Subsequently, this light is reflected by the first reflecting surface of the second surface 33, and after being further reflected by the third surface 34, reaches the second surface 33. The light is then diffracted and reflected by the third reflecting surface of the second surface 33 and is refracted through the first surface 32 to emerge from the prism. The viewer focuses his eye on the exit pupil 31, thereby carrying out the observation of the projected image (the image).

Figure 17:
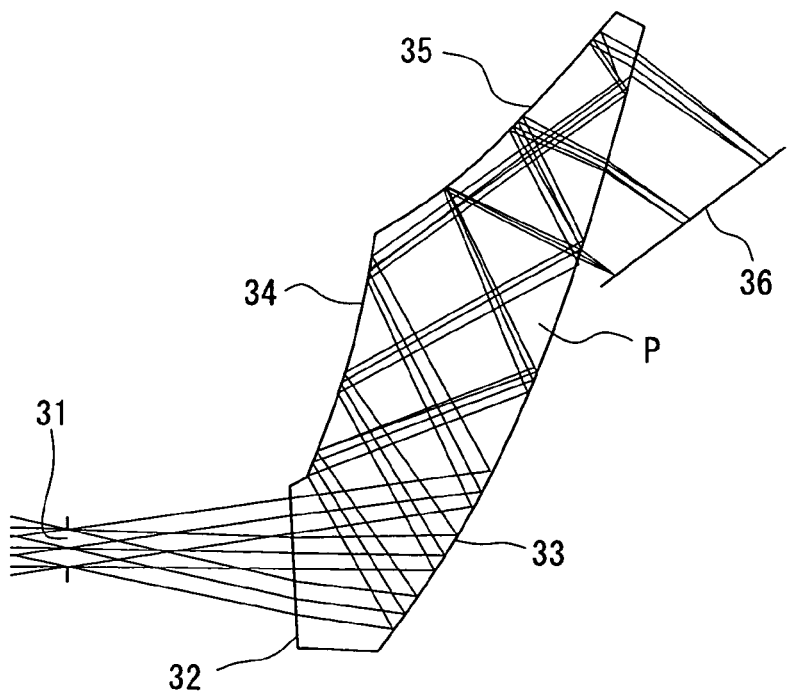
FIG. 17 is a view showing another example of the prism applicable to the prism member of the observation optical system of the present invention.

The prism P of FIG. 17 has the first surface 32, the second surface 33, the third surface 34, and the fourth surface 35. Here, the first surface 32 is configured as the exit surface. The second surface 33 is also used as the entrance surface, the second reflecting surface, and fourth reflecting surface and has the shape of the rotational-asymmetrical free-formed surface. The entrance surface and the second reflecting surface have a common area on the same surface. The fourth reflecting surface is located at a different place on the same surface. The HOE is adhered to the free-formed surface constituting the fourth reflecting surface. The third surface 34 is configured as the third reflecting surface, and the fourth surface 35 is the first reflecting surface.

In this prism P, light emanating from the LCD 36 is refracted through the entrance surface of the second surface 33 and is incident on the prism. Subsequently, this light, after being reflected by the fourth surface 35, is reflected by the second reflecting surface of the second surface 33 and is further reflected by the third surface 34 to reach the second surface 33. The light is then diffracted and reflected by the fourth reflecting surface of the second surface 33 and is refracted through the first surface 32 to emerge from the prism. The viewer focuses his eye on the exit pupil 31, thereby carrying out the observation of the projected image (the image).

Figure 18:
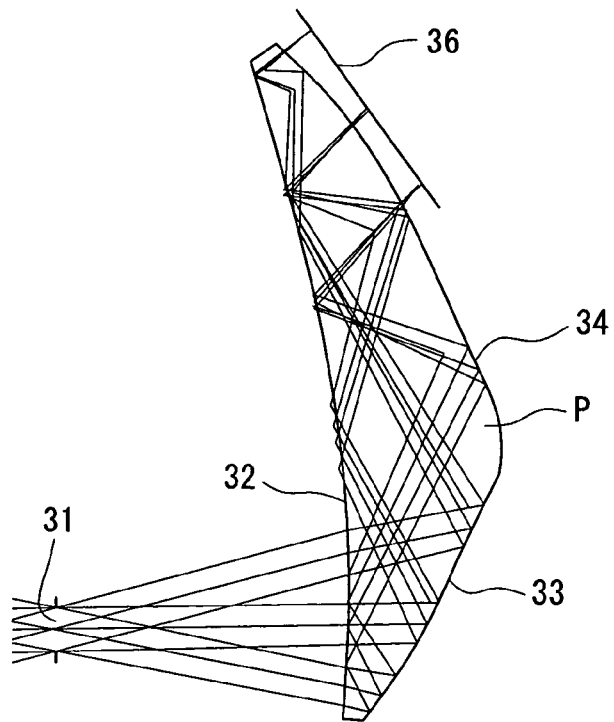
FIG. 18 is a view showing another example of the prism applicable to the prism member of the observation optical system of the present invention.

The prism P of FIG. 18 has the first surface 32, the second surface 33, and the third surface 34. Here, the first surface 32 is also used as the first reflecting surface, the third reflecting surface, and the exit surface. The second surface 33 is configures as the fourth reflecting surface and has the shape of the rotational-asymmetrical free-formed surface, to which the HOE is adhered. The third surface 34 combines the entrance surface with the second reflecting surface.

In this prism P, light emanating from the LCD 36 is refracted through the entrance surface of the third surface 34 and is incident on the prism. Subsequently, this light, after being reflected by the first reflecting surface of the first surface 32, is reflected by the second reflecting surface of the third surface 34 and is further reflected by the third reflecting surface of the first surface 32 to reach the second surface 33. The light is diffracted and reflected by the second surface 33 and then is refracted through the exit surface constituting the first surface 32 to emerge from the prism. The viewer focuses his eye on the exit pupil 31, thereby carrying out the observation of the projected image (the image).

Figure 19:
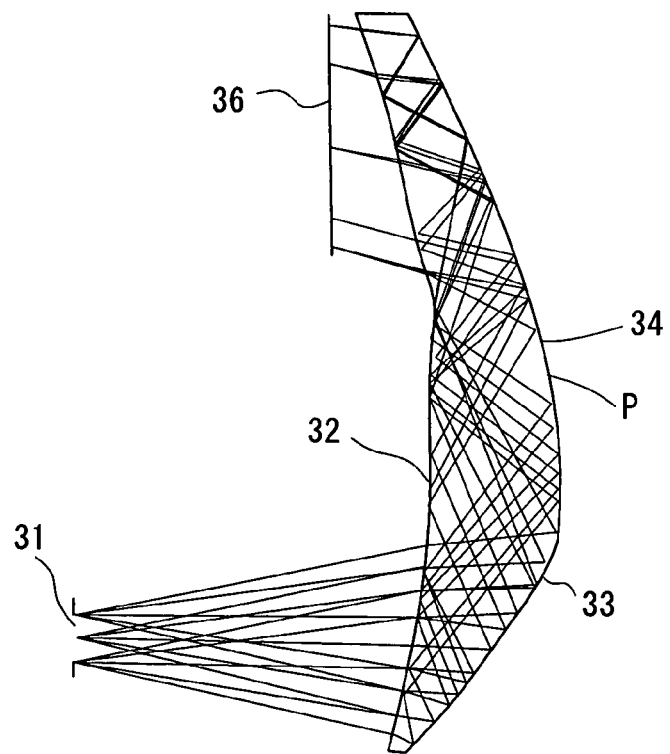
FIG. 19 is a view showing another example of the prism applicable to the prism member of the observation optical system of the present invention.

The prism P of FIG. 19 has the first surface 32, the second surface 33, and the third surface 34. Here, the first surface 32 is also used as the entrance surface, the second reflecting surface, the fourth reflecting surface, and the exit surface. The second surface 33 is configured as the fifth reflecting surface and has the shape of the rotational-asymmetrical free-formed surface, to which the HOE is adhered. The third surface 34 combines the first reflecting surface with the third reflecting surface.

In this prism P, light emanating from the LCD 36 is refracted through the entrance surface of the first surface 32 and is incident on the prism. Subsequently, this light, after being reflected by the first reflecting surface of the third surface 34, is reflected by the second reflecting surface of the first surface 32. The light, after being further reflected by the third reflecting surface of the third surface 34, is reflected by the fourth reflecting surface of the first surface 32 and reaches the second surface 33. The light is diffracted and reflected by the second surface 33 and then is refracted through the exit surface of the first surface 32 to emerge from the prism. The viewer focuses his eye on the exit pupil 31, thereby carrying out the observation of the projected image (the image).

Figure 20:
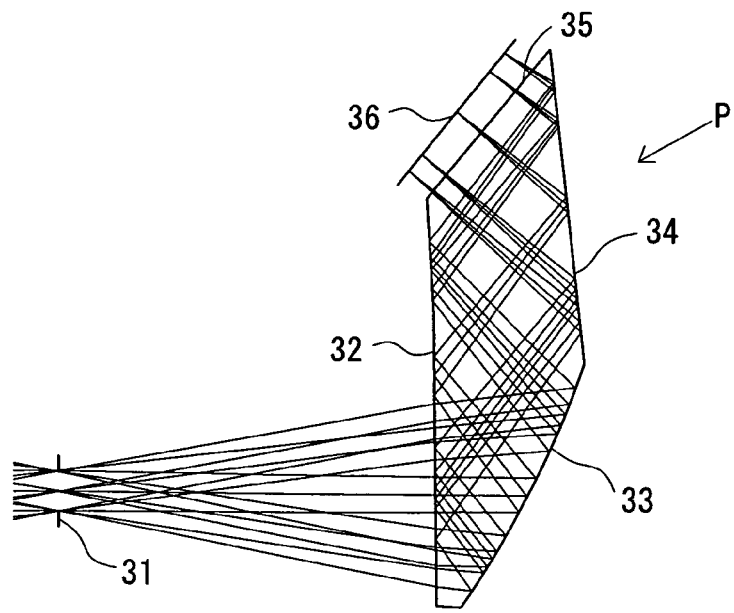
FIG. 20 is a view showing another example of the prism applicable to the prism member of the observation optical system of the present invention.

The prism P of FIG. 20 has the first surface 32, the second surface 33, the third surface 34, and the fourth surface 35. Here, the first surface 32 combines the second reflecting surface with the exit surface. The second surface 33 is configured as the third reflecting surface and has the shape of the rotational-asymmetrical free-formed surface, to which the HOE is adhered. The third surface 34 is configured as the first reflecting surface, and the fourth second 35 is the entrance surface.

In this prism P, light emanating from the LCD 36 is refracted through the fourth surface 35 and enters the prism. Subsequently, this light, after being reflected by the third surface 34, is further reflected by the second reflecting surface constituting the first surface 32 and reaches the second surface 33. The light is diffracted and reflected by the second surface 33 and then is refracted through the exit surface constituting the first surface 32 to emerge from the prism. The viewer focuses his eye on the exit pupil 31, thereby carrying out the observation of the projected image (the image).

Figure 21:
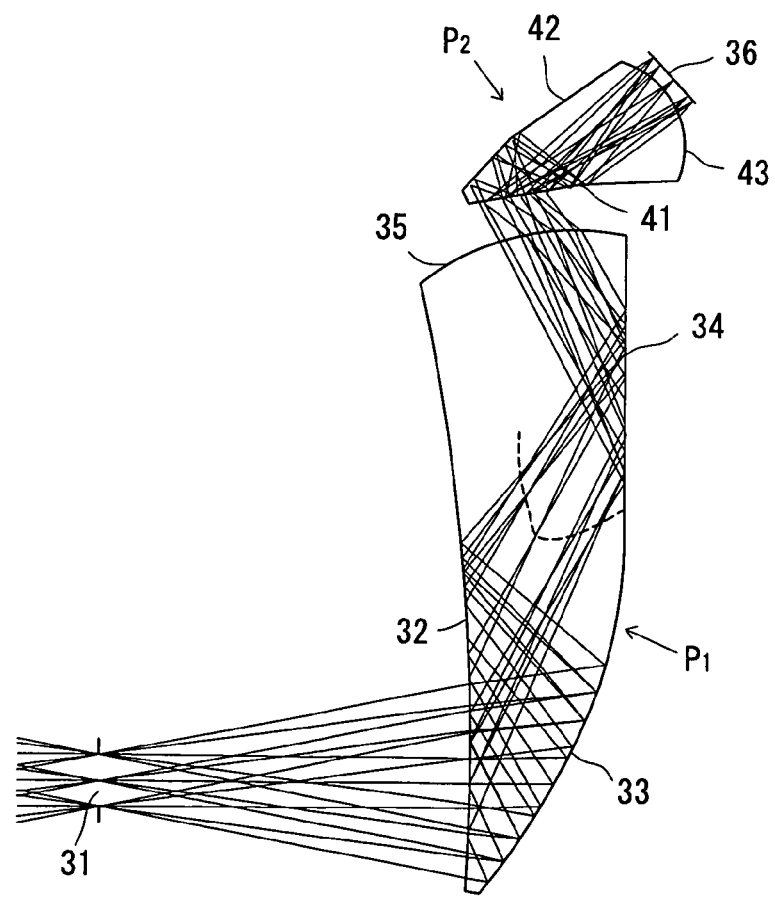
FIG. 21 is a view showing another example of the prism applicable to the prism member of the observation optical system of the present invention.

The prism P of FIG. 21 includes a first prism P1 and a second prism P2. The first prism P1 has the first surface 32, the second surface 33, the third surface 34, and the fourth surface 35. Here, the first surface 32 combines the second reflecting surface with the exit surface in the first prism P1. The second surface 33 is configured as the third reflecting surface in the first prism P1 and has the shape of the rotational-asymmetrical free-formed surface, to which the HOE is adhered. The third surface 34 is configured as the first reflecting surface in the first prism P1. The fourth surface 35 is the entrance surface in the first prism P1.

The second prism P2 has a first surface 41, a second surface 42, and a third surface 43. Here, the first surface 41 is configured as the exit surface in the second prism P2. The third surface 43 is the entrance surface in the second prism P2.

In this prism P, light emanating from the LCD 36 is refracted through the third surface 43 of the second prism P2 and enters the prism. Subsequently, this light, after being reflected by the first reflecting surface of the first surface 41 and further reflected by the second surface 42, is refracted through the first surface 41 and emerges from the prism. Further, the light is refracted through the fourth surface 35 of the first prism P1 and enters the prism. Subsequently, this light, after being reflected by the third surface 34, is further reflected by the second reflecting surface of the first surface 32 and reaches the second surface 33. The light is diffracted and reflected by the second surface 33 and then is refracted through the exit surface of the first surface 32 to emerge from the prism. The viewer focuses his eye on the exit pupil 31, thereby carrying out the observation of the projected image (the image).

Figure 22:
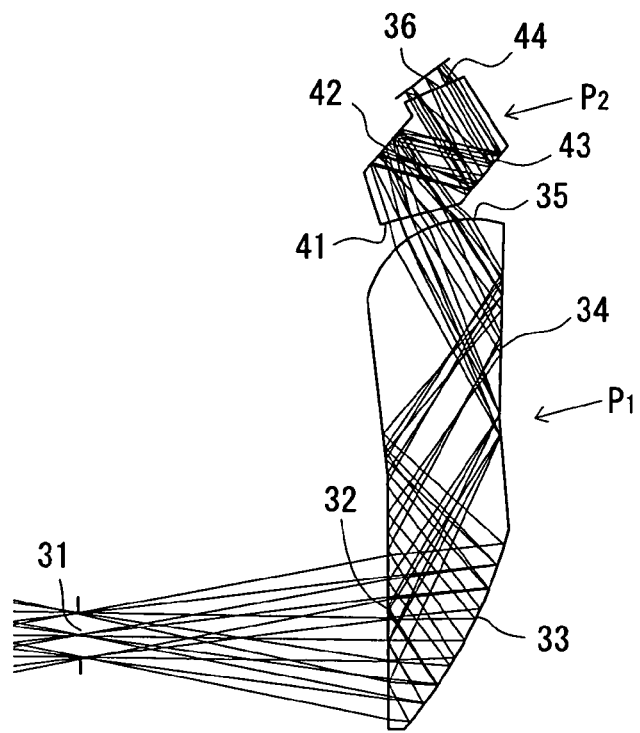
FIG. 22 is a view showing another example of the prism applicable to the prism member of the observation optical system of the present invention.

The prism P of FIG. 22 includes the first prism P1 and the second prism P2. The first prism P1 has the first surface 32, the second surface 33, the third surface 34, and the fourth surface 35. Here, the first surface 32 combines the second reflecting surface and the exit surface in the first prism P1. The second surface 33 is configured as the third reflecting surface in the first prism P1 and has the shape of the rotational-asymmetrical free-formed surface, to which the HOE is adhered. The third surface 34 is configured as the first reflecting surface in the first prism P1. The fourth surface 35 is the entrance surface in the first prism P1.

The second prism P2 has the first surface 41, the second surface 42, the third surface 43, and a fourth surface 44. Here, the first surface 41 is configured as the exit surface in the second prism P2. The second surface 42 is the second reflecting surface in the second prism P2. The third surface 43 is the first reflecting surface in the second prism P2. The fourth surface 44 is the entrance surface in the second prism P2.

In this prism P, light emanating from the LCD 36 is refracted through the fourth surface 44 of the second prism P2 and enters the prism. Subsequently, this light, after being reflected by the third surface 43 and further reflected by the second surface 42, is refracted through the first surface 41 and emerges from the prism. Further, the light is refracted through the fourth surface 35 of the first prism P1 and enters the prism. Subsequently, this light, after being reflected by the third surface 34, is further reflected by the second reflecting surface of the first surface 32 and reaches the second surface 33. The light is diffracted and reflected by the second surface 33 and then is refracted through the exit surface of the first surface 32 to emerge from the prism. The viewer focuses his eye on the exit pupil 31, thereby carrying out the observation of the projected image (the image).

Figure 23:
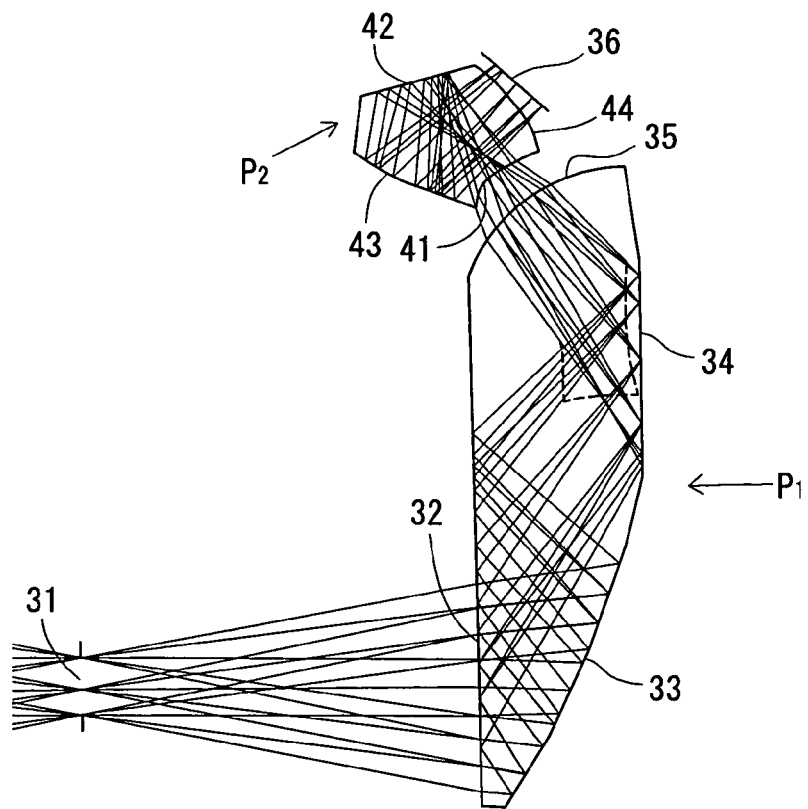
FIG. 23 is a view showing another example of the prism applicable to the prism member of the observation optical system of the present invention.

The prism P of FIG. 23 includes the first prism P1 and the second prism P2. The first prism P1 has the first surface 32, the second surface 33, the third surface 34, and the fourth surface 35. Here, the first surface 32 combines the second reflecting surface with the exit surface in the first prism P1. The second surface 33 is configures as the third reflecting surface in the first prism P1 and has the shape of the rotational-asymmetrical free-formed surface, to which the HOE is adhered. The third surface 34 is configured as the first reflecting surface in the first prism P1. The fourth surface 35 is the entrance surface in the first prism P1.

The second prism P2 has the first surface 41, the second surface 42, the third surface 43, and the fourth surface 44. Here, the first surface 41 is configured as the exit surface in the second prism P2. The second surface 42 is the second reflecting surface in the second prism P2. The third surface 43 is the first reflecting surface in the second prism P2. The fourth surface 44 is the entrance surface in the second prism P2.

In this prism P, light emanating from the LCD 36 is refracted through the fourth surface 44 of the second prism P2 and enters the prism. Subsequently, this light, after being reflected by the third surface 43 and further reflected by the second surface 42, is refracted through the first surface 41 and emerges from the prism. Further, the light is refracted through the fourth surface 35 of the first prism P1 and enters the prism. Subsequently, this light, after being reflected by the third surface 34, is further reflected by the second reflecting surface of the first surface 32 and reaches the second surface 33. The light is diffracted and reflected by the second surface 33 and then is refracted through the exit surface of the first surface 32 to emerge from the prism. The viewer focuses his eye on the exit pupil 31, thereby carrying out the observation of the projected image (the image).

Also, the prism P of FIG. 22 has the same arrangement as the prism P of FIG. 23 with the exception that, in the second prism P2, the optical path connecting the third surface and the fourth surface and that connecting the first surface and the second surface fail to intersect in FIG. 22, but intersect in FIG. 23.

Subsequently, the image display apparatus using the observation optical system mentioned above is illustrated below.

Figure 24:
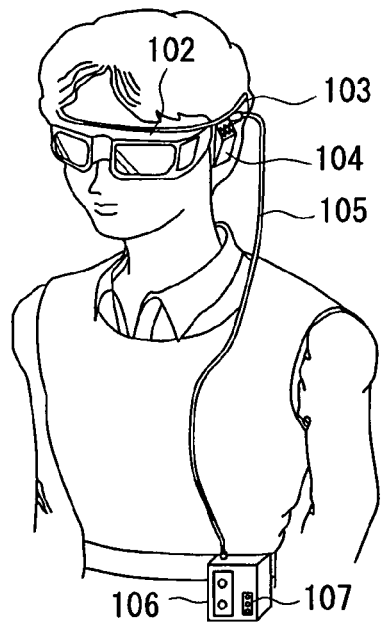
FIG. 24 is a view showing a state where a head mounted image display apparatus for both eyes is mounted on a viewer's head.
Figure 25:
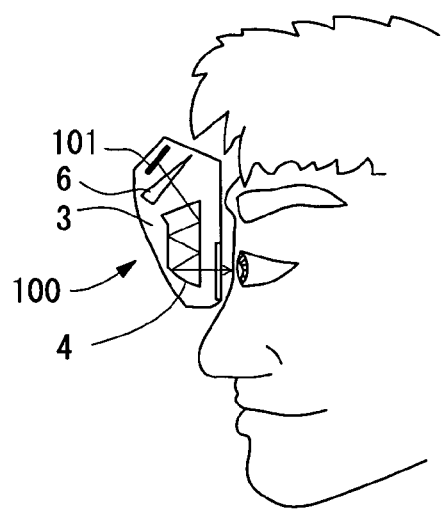
FIG. 25 is a sectional view of FIG. 24.

As an example, a head mounted image display apparatus for both eyes is cited. The image display apparatus mounted on a viewer's head is shown in FIGS. 24 and 25. In this image display apparatus, the observation optical apparatus according to the present invention is used as the eyepiece optical system as shown in FIG. 25. In the image display apparatus, a display body 102 has an eyepiece optical system 100 and the image display elements 5 on each of the left and right sides, which are spaced an interpupillary distance away. By doing so, the head mounted image display apparatus in which an image can be observed with both eyes is realized. Also, although in this example the image display apparatus 102 is of a portable type, it may be of a fixed type.

In the image display body 102, the observation optical system mentioned above is used as the eyepiece optical system 100. The eyepiece optical system 100 is provided on each of the left and right sides. On each side, in accordance with the eyepiece optical system 100, the image display element 5 constructed with a liquid crystal display element is located at the position of the image plane. In the image display body 102, as shown in FIG. 24, temple frames 103 are provided in succession to the left and the right so that the image display body 102 can be supported in front of the viewer's eyes. Also, in FIG. 25, the image display apparatus is constructed on the premise that the image is observed with the naked eyes. Thus, the image display apparatus is not constructed so that lenses for spectacles are integrally incorporated in the image display body 102. However, the lenses for spectacles may be incorporated to constitute the image display body 102.

One of the temple frames 103 is provide with a speaker 104. Hence, the image display apparatus is such that the viewer is capable of hearing a stereophonic sound together with the image observation. In this way, a reproduction device 106, such as a portable video cassette, is connected to the temple frame 103 having the speaker 104 through an image sound transmission cord 105. The viewer, as shown in the figure, holds the reproduction device 106 at an arbitrary position of a belt. In doing so, the viewer is capable of readily enjoying the image sound. In FIG. 24, reference numeral 107 represents a control section for the switch and volume of the reproduction device 106. Also, electronic parts of image and sound processing circuits are incorporated in the image display body 102.

The tip of the cord 105 may be constructed as a jack so that it can be mounted to an existing video deck. In addition, it may be connected to a tuner for TV wave reception so that TV enjoyment is provided. Alternatively, it may be connected to a computer so that the image of computer graphics and a message image from the computer are received. In order to eliminate an obstructive cord, an antenna may be provided so that a signal from the exterior is received by an electric wave.

Figure 26:
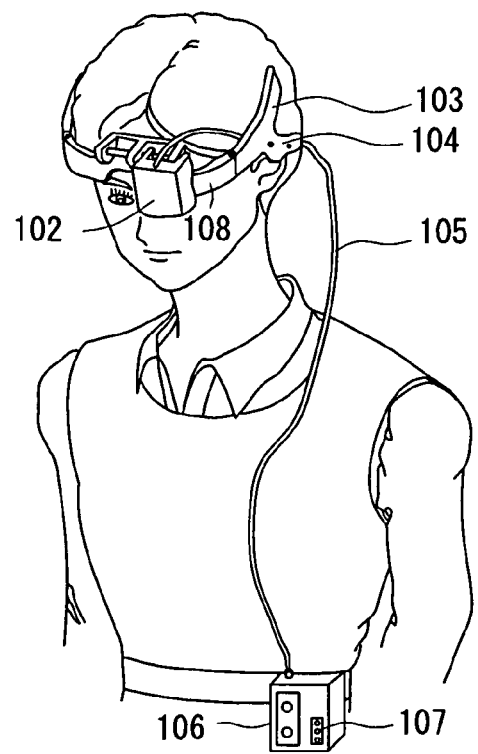
FIG. 26 is a view showing a state where a head mounted image display apparatus for one eye, using the observation optical system of the present invention, is mounted on the viewer's head.

The observation optical system according to the present invention may be used in the image display apparatus in which the eyepiece optical system is placed in front of the eye of one of the left and the right. In this case, the image display apparatus, as shown in FIG. 26, has the aspect of a head mounted image display apparatus for one eye. The image display apparatus (for the left eye in this case) mounted on the viewer's head is shown in FIG. 26. With this construction, the display body 102 has the eyepiece optical system and the image display element 5 as one set. The display body 102 is attached to a front frame 108. Also, the display body 102 is fixed to a position corresponding to one of the viewer's eyes. In the front frame 108, the temple frames 103 are provide in succession to the left and the right. Thus, the image display apparatus is such that the display body 102 can be supported in front of the viewer's eye. Other features of the construction are the same as in FIGS. 24 and 25 and thus their explanation is omitted.

Figure 27:
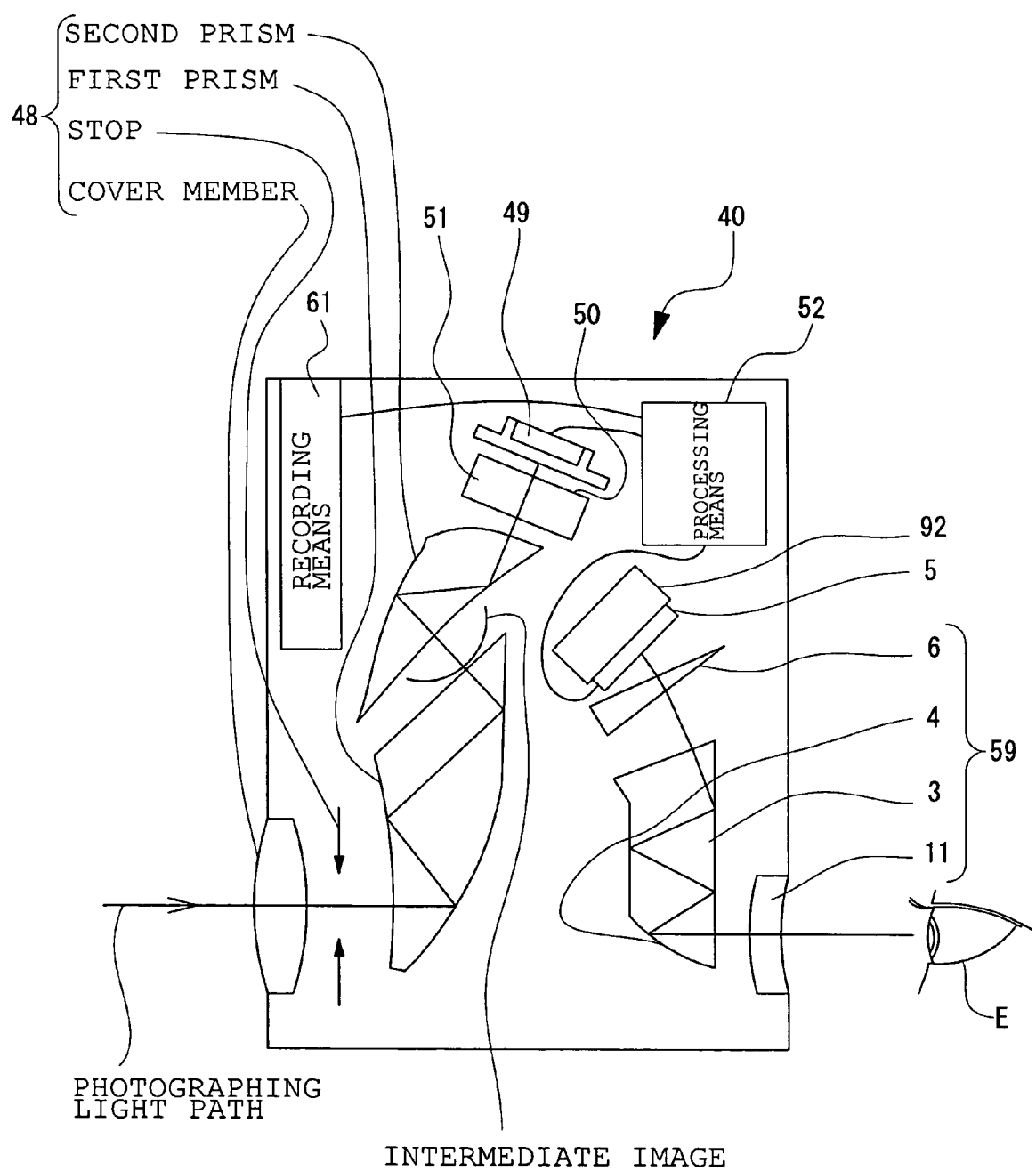
FIG. 27 is a conceptual view showing an electronic camera applying the observation optical system of the present invention.

FIG. 27 shows an electronic camera 40. In this example, the observation optical system of the present invention is incorporated in an eyepiece optical system 59.

By a photographing objective optical system 48 placed on a photographing optical path, an object image is formed on an imaging surface 50 of a CCD 49. At this time, light from an object is incident on the CCD 49 through a filter 51. The object image received by the CCD 49 is displayed as an electronic image, through a processing means 52, on the liquid crystal display element (LCD) 5. The object image photographed by the CCD 49 is recorded as electronic information. The processing means 52 thus makes the control of a recording means. The image displayed on the CCD 5 is projected at a preset position through the eyepiece optical system 59. At the same time, the exit pupil is also formed through the eyepiece optical system 59. The viewer, when focusing an eye E on the exit pupil, is capable of observing the image displayed on the LCD 5.

The eyepiece optical system 59 can use a decentering prism optical system that is the same as in the above embodiments. The decentering prism optical system that is the same as in FIG. 9 is used here. The eyepiece optical system 59 has a wedge prism 6 and a cover lens 11. The cover lens 11 is located on the exit-pupil side of the decentering prism optical system. On the back side of the LCD 5, a back light 92 is placed to illuminate the LCD.

In the camera 40 constructed as mentioned above, the photographing objective optical system 48 and the eyepiece optical system 59 can be constructed with a small number of optical members. As a result, the high-performance and low-cost design of the camera 40 can be attained. Moreover, since the optical members of the entire optical system can be juxtaposed on the same plane, the slim design of the camera 40, relative to a thickness in a direction perpendicular to the plane of the placement, can be accomplished.

Figure 28A:
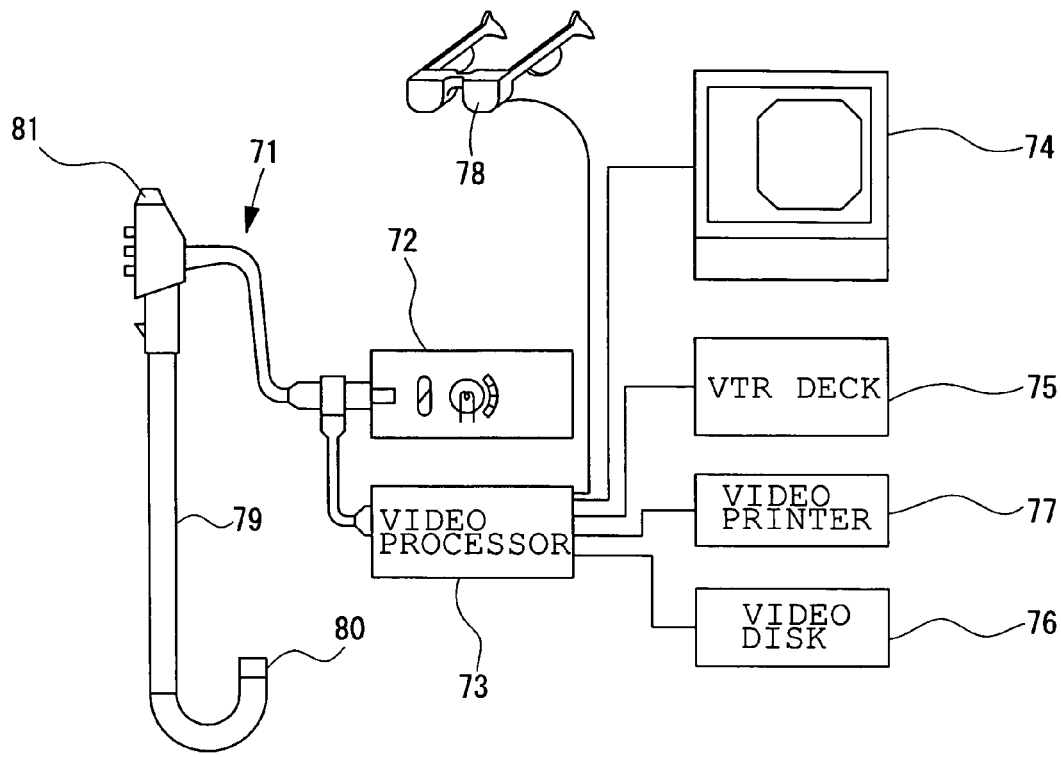
FIGS. 28A and 28B are conceptual views showing an electronic endoscope applying the observation optical system of the present invention.
Figure 28B:
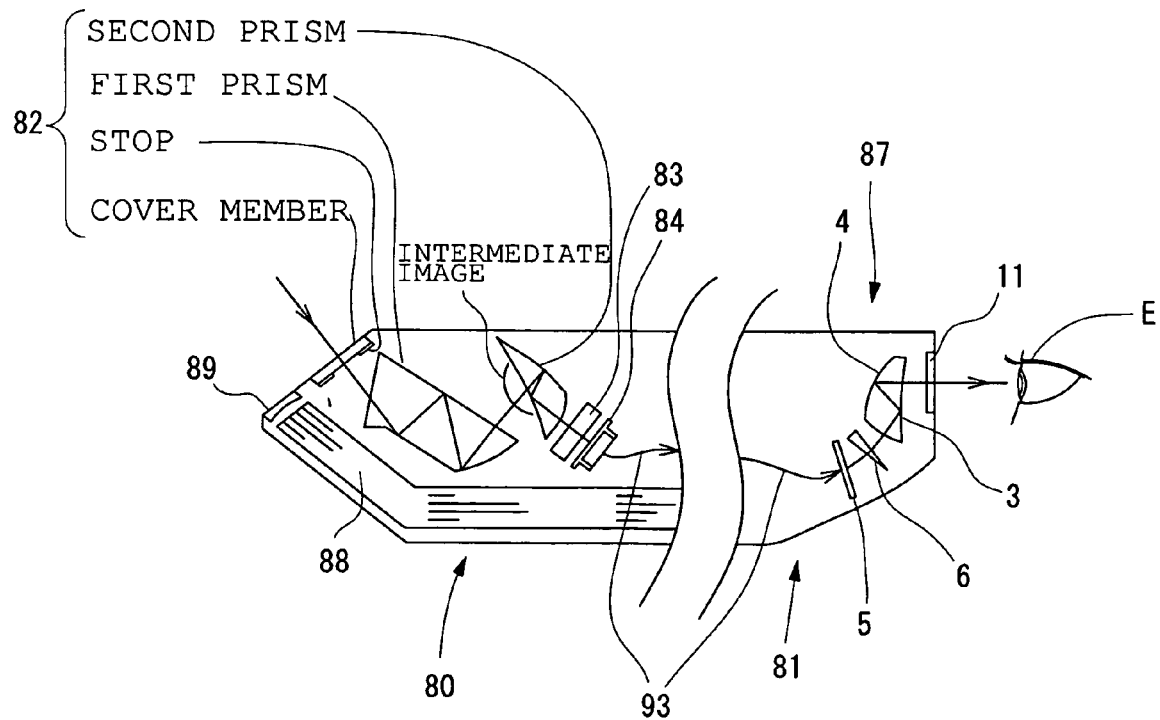

Next, an electronic endoscope is shown in FIGS. 28A and 28B.

In this example, the observation optical system of the present invention is incorporated in an eyepiece optical system 87 of an observation system. In addition, the observation optical system of the present invention in each of the above embodiments is used for a first prism of the eyepiece optical system 87. The observation optical system of FIG. 1 is used here.

The electronic endoscope, as shown in FIG. 28A, includes an electronic endoscope 71, a light source device 72 supplying illumination light, a video processor 73, a monitor 74, a VTR deck 75, a video disk 76, a video printer 77, and a head mounted image display apparatus (HMD) 78.

Here, the light source device 72 provides illumination light. The video processor 73 performs signal processing with respect to the electronic endoscope 71. The monitor 74 displays an image signal output from the video processor 73. The VTR deck 75 and the video disk 76 are connected to the video processor 73 to record the image signal. The video printer 77 prints out the image signal as an image. As the head mounted image display apparatus (HMD) 78, for example, that shown in FIG. 24 is used.

A distal end 80 of an insertion tube section 79 of the electronic endoscope 71 and an eyepiece section 81 thereof are constructed as shown in FIG. 28B.

A light beam emitted form the light source device 72 is conducted through a light guide fiber bundle 88 to an illumination objective optical system 89. By the illumination objective optical system 89, a part to be observed is illuminated with the light beam. Light from the part to be observed passes through the observation objective optical system 82 through a cover member. An object image is formed by the observation objective optical system 82. At this time, this object image is formed on the imaging surface of a CCD 84 through a filter 83 such as a low-pass filter or an infrared cutoff filter. In addition, the object image is transformed into an image signal by the CCD 84.

The image signal is displayed directly on the monitor 74 by the video processor 73 shown in FIG. 28A. It is recorded in the VTR deck 75 and the video desk 76. Alternatively, the image signal is printed out as an image from the video printer 77. The image is displayed on the image display element 101 (FIG. 25) of the HMD 78. The viewer mounts the HMD 78 and thereby is capable of observing the object image.

At the same time, the image signal transformed by the CCD 84 is displayed as an electronic image, through an image signal conducting means 93, on the liquid crystal display element (LCD) 5 of the eyepiece section 81. This displayed image is projected at a preset position through the eyepiece optical system 87. At the same time, the exit pupil is also formed through the eyepiece optical system 87. The viewer, when focusing the eye E on the exit pupil, is capable of observing the image displayed on the CCD 5.

In the endoscope designed as mentioned above, the optical system can be constructed with a small number of optical members. As a result, the high-performance and low-cost design of the endoscope can be attained.

Figure 29:
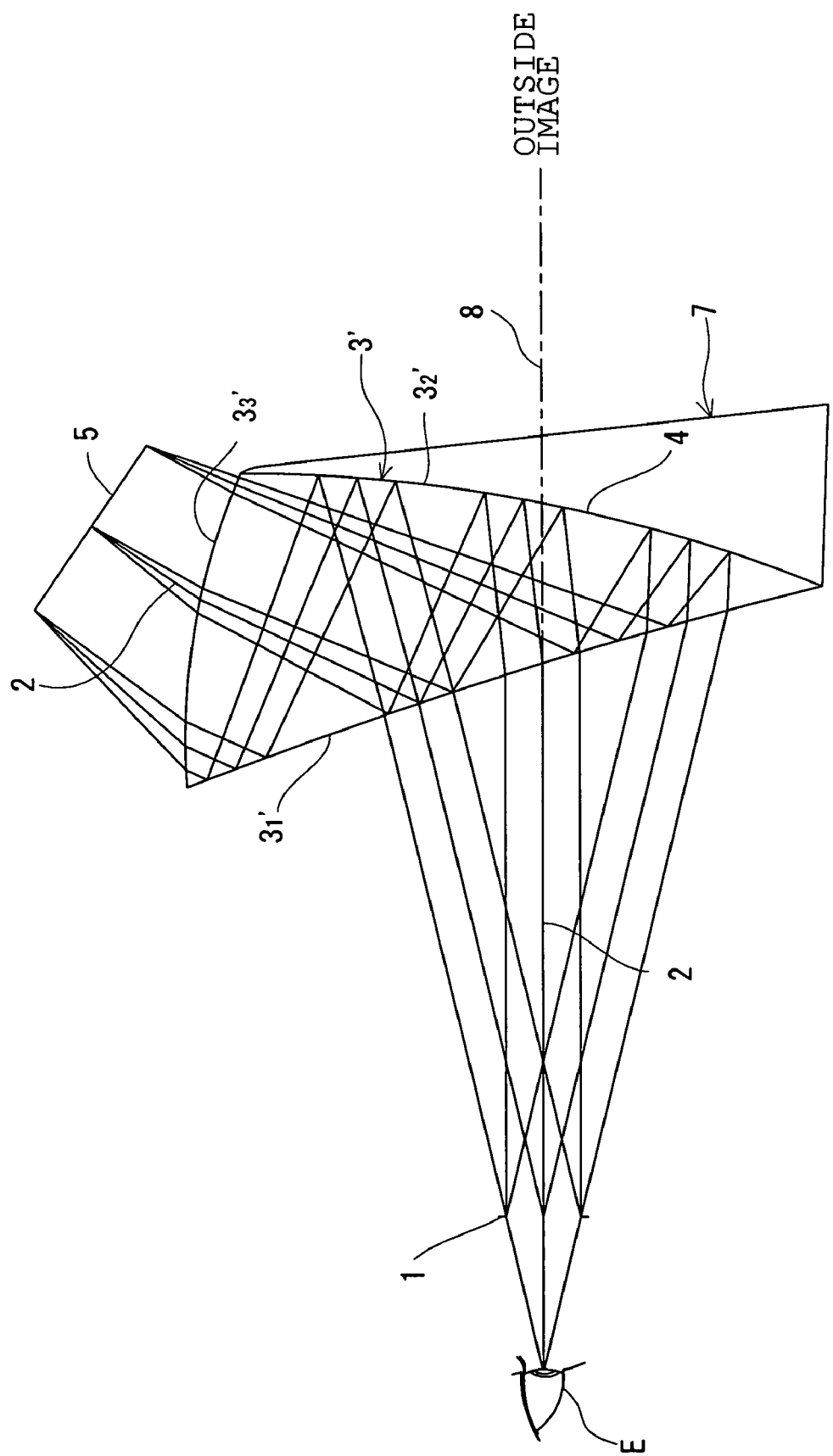
FIG. 29 is a view showing still another example of the prism applicable to the prism member of the observation optical system of the present invention.

Subsequently, a description is given of the observation optical system of another embodiment in the present invention. FIG. 29 shows this observation optical system.

The observation optical system according to this embodiment includes the prism 3', the image display element 5 placed on the side of the entrance surface $3_3'$ of the prism 3', a see-through optical element 7 (the second prism) placed on the outer surface of the free-formed surface $3_2'$ of the prism 3', and the reflection-type HOE 4 interposed between the prism 3' and the see-through optical element 7. The prism 3' and the reflection-type HOE 4 are the same as those of the observation optical system of Embodiment 5, and thus their explanation is omitted.

In the embodiment, an image formed by the image display element 5 is displayed as a virtual image on the outside image side. When a straight line connecting the virtual image with the center of the eye E of the viewer is defined as a visual axis 8, the volume holographic optical element 4 is placed on the visual axis 8.

The see-through optical element 7, with the volume holographic optical element 4 between the prism 3' and the see-through optical element 7, is closely adhered to the outer surface of the free-formed surface $3_2'$ of the prism 3'.

Here, the observation optical system of the embodiment is such that the see-through optical element 7 cancels the power of the prism 3' in the direction of the visual axis. Specifically, the observation optical system is constructed so that a combined magnification given when a ray of light emanating from the outside image is transmitted through the see-through optical element 7 and the prism 3' cancels a magnification produced in the prism 3' by the see-through optical element 7.

In the observation optical system of the embodiment constructed as mentioned above, it becomes possible that the image formed by the image display element is displayed as the virtual image on the extension line of the visual axis 8 and the virtual image is superimposed on the outside image to make observations.

Figure 30:
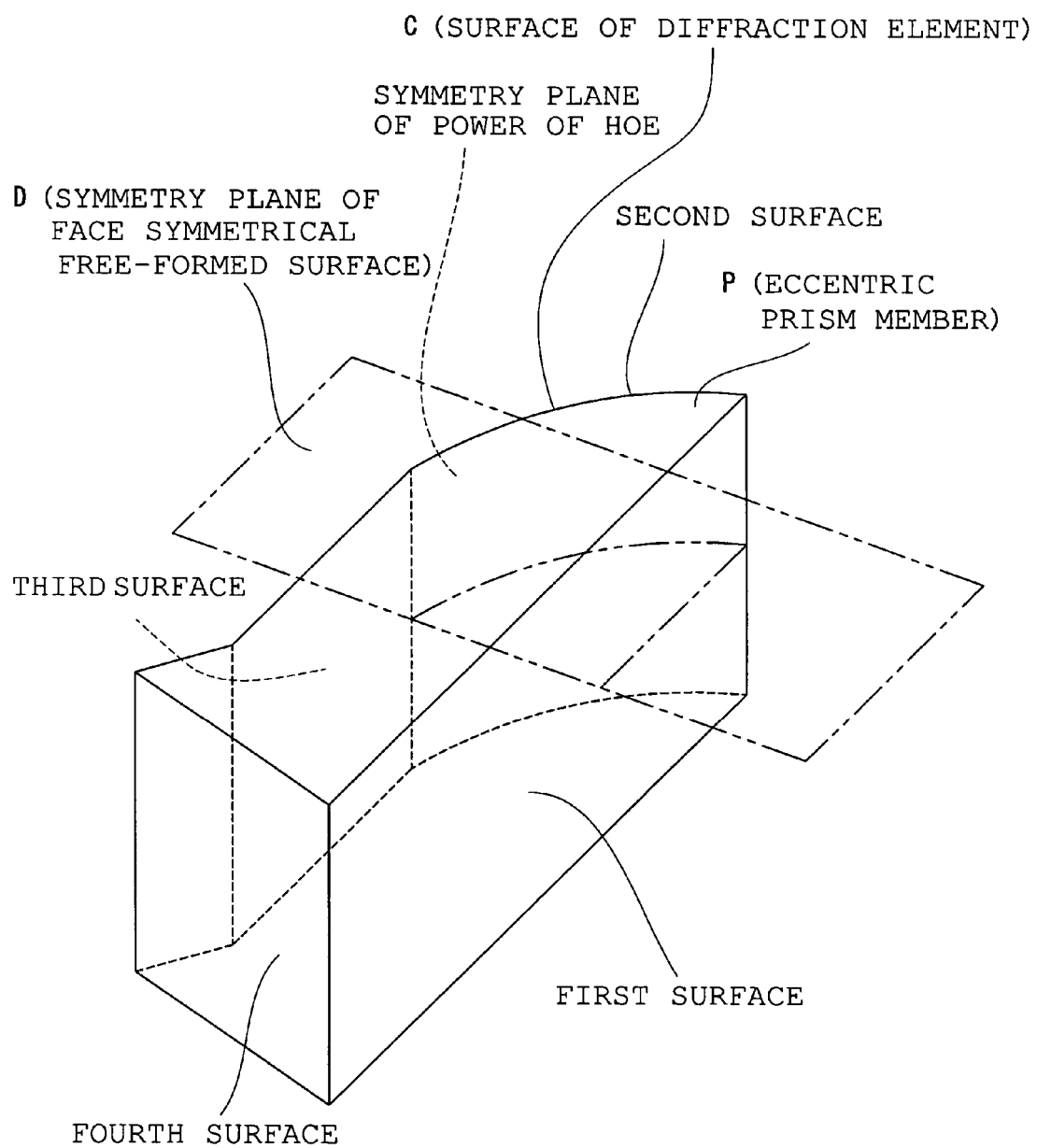
FIG. 30 is a view showing a favorable configuration of the HOE and the prism in the present invention.

Next, a desirable positional relationship between the HOE (the diffraction element) and the free-formed surface, used in the observation optical system of the present invention is shown in FIG. 30. Here, it is assumed that the HOE is closely adhered to the free-formed surface of the prism P.

This free-formed surface is assumed to be plane-symmetrical. The contour of a surface C of the HOE is also assumed to be square.

In this figure, the decentering prism P is the one contained in the observation optical system of the present invention. Now, it is assumed that the surface C of the HOE is provided to the second surface. In this case, in order to form a sharp image, it is desirable that the contour of the free-formed surface is determined so that a symmetry plane D of the free-formed surface in the decentering prism P is parallel with at least one side of the contour of the HOE.

In addition, when the contour of the HOE is square or rectangular, each of four interior angles is 90°. In such a case, it is desirable that the contour of the free-formed surface is determined so that the symmetry plane D of the free-formed surface is parallel with two sides that are parallel with each other in the contour of the HOE. It is further desirable that the contour of the free-formed surface is determined so that the symmetry plane coincides with a position where the surface C of the HOE is divided laterally or vertically to be symmetrical. This facilitates the accuracy of assembly of the apparatus and is effective for the improvement of mass production.

Of optical surfaces of the decentering prism P (for example, of first, second, and third surfaces when three optical surfaces are provided), a plurality of surfaces or all surfaces are assumed to be plane-symmetrical free-formed surfaces. In this case, it is favorable for design and correction of aberration that the contours of individual surfaces are determined so that the symmetrical planes of the plurality of surfaces or all surfaces are identical.

The symmetry plane of these free-formed surfaces is made to coincide with that of the power of the HOE, and thereby further advantages are offered to design and correction of aberration, which is desirable.

What is claimed is:

1. An observation optical system having an entrance surface, a reflecting surface, and an exit surface,
   at least one of the entrance surface, the reflecting surface, and the exit surface being configured as a free-formed surface,
   a volume holographic optical element being provided to the free-formed surface,
   wherein the following conditions are satisfied:

$-0.20 < \phi x/Px < 0.30$ $-0.20 < \phi y/Py < 0.20$ where $\phi x$ is a power, in a direction of an X axis, of the volume holographic optical element at a point of intersection of an axial principal ray with a surface of the volume holographic optical element, $\phi y$ is a power, in a direction of a Y axis, of the volume holographic optical element at the point of intersection of the axial principal ray with the surface of the volume holographic optical element, Px is a total power, in the direction of the X axis, of the observation optical system, and Py is a total power, in the direction of the Y axis, of the observation optical system,
   the X axis being defined to be perpendicular to the Y axis and a Z axis, the Y axis being defined to be perpendicular to the Z axis and to lie in a plane of decentration of the observation optical system, and the Z axis being defined as the axial principal ray as entering the entrance surface of the observation optical system.

2. An observation optical system having an entrance surface, a reflecting surface, and an exit surface, the observation optical system comprising:

a prism in which the reflecting surface is configured as a free-formed surface; and a volume holographic optical element provided to the free-formed surface of the prism, wherein the following conditions are satisfied:

$$-0.20 < \phi x/Px < 0.30$$

$$-0.20 < \phi y/Py < 0.20$$

where $\phi x$ is a power, in a direction of an X axis, of the volume holographic optical element at a point of intersection of an axial principal ray with a surface of the volume holographic optical element, $\phi y$ is a power, in a direction of a Y axis, of the volume holographic optical element at the point of intersection of the axial principal ray with the surface of the volume holographic optical element, Px is a total power, in the direction of the X axis, of the observation optical system, and Py is a total power, in the direction of the Y axis, of the observation optical system, the X axis being defined to be perpendicular to the Y axis and a Z axis, the Y axis being defined to be perpendicular to the Z axis and to lie in a plane of decentration of the observation optical system, and the Z axis being defined as the axial principal ray as entering the entrance surface of the observation optical system.

3. An observation optical system comprising:

an image display element;

an eyepiece optical system introducing an image formed by the image display element into a center of a viewer's eye so that the viewer is capable of observing the image as a virtual image; and a see-through optical element provided in a direction of a visual axis of the eyepiece optical system, canceling power in the direction of the visual axis and introducing an outside image in the direction of the visual axis into the center of the viewer's eye so that an image formed by the image display element with respect to the outside image is displayed as a virtual image and is superimposed on the outside image to make observations, the eyepiece optical system having an entrance surface, a reflecting surface, and an exit surface, the eyepiece optical system including:

a prism in which the reflecting surface is configured as a free-formed surface; and a volume holographic optical element provided to the free-formed surface of the prism, the volume holographic optical element being placed on the visual axis, the visual axis referring to a straight line connecting the virtual image with the center of the viewer's eye, wherein the following conditions are satisfied:

$$-0.20 < \phi x/Px < 0.30$$

$$-0.20 < \phi y/Py < 0.20$$

where $\phi x$ is a power, in a direction of an X axis, of the volume holographic optical element at a point of intersection of an axial principal ray with a surface of the volume holographic optical element, $\phi y$ is a power, in a direction of a Y axis, of the volume holographic optical element at the point of intersection of the axial principal ray with the surface of the volume holographic optical element, Px is a total power, in the direction of the X axis, of the observation optical system, and Py is a total power, in the direction of the Y axis, of the observation optical system, the X axis being defined to be perpendicular to the Y axis and a Z axis, the Y axis being defined to be perpendicular to the Z axis and to lie in a plane of decentration of the observation optical system, and the Z axis being defined as the axial principal ray as entering the entrance surface of the observation optical system.

4. An observation optical system having an entrance surface, a reflecting surface, and an exit surface, at least one of the entrance surface, the reflecting surface, and the exit surface being configured as a free-formed surface, a volume holographic optical element being provided to the free-formed surface, wherein the following conditions are satisfied:

$$-0.28 < \phi x/\Phi x < 0.39$$

$$-0.29 < \phi y/\Phi y < 0.35$$

$$-0.52 < \phi mx/\Phi mx < 1.30$$

$$-0.52 < \phi my/\Phi my < 1.30$$

where $\phi x$ is a power, in a direction of an X axis, of the volume holographic optical element at a point of intersection of an axial principal ray with a surface of the volume holographic optical element, $\phi y$ is a power, in a direction of a Y axis, of the volume holographic optical element at the point of intersection of the axial principal ray with the surface of the volume holographic optical element, $\Phi x$ is a power, in the direction of the X axis, of a geometric configuration of the free-formed surface, which constitutes a substrate of the volume holographic optical element, at the point of intersection of the axial principal ray with the surface of the holographic optical element, $\Phi y$ is a power, in the direction of the Y axis, of the geometric configuration of the free-formed surface, which constitutes the substrate of the volume holographic optical element, at the point of intersection of the axial principal ray with the surface of the volume holographic optical element, $\phi mx$ is a power, in the direction of the X axis, of the volume holographic optical element at a point on the X axis with a largest absolute value within an effective ray limit, $\phi my$ is a power, in the direction of the Y axis, of the volume holographic optical element at a point on the Y axis with a largest absolute value within the effective ray limit, $\Phi mx$ is a power, in the direction of the X axis, of the geometric configuration of the free-formed surface, which constitutes the substrate of the volume holographic optical element, at the point on the X axis with the largest absolute value within the effective ray limit, and $\Phi my$ is a power, in the direction of the Y axis, of the geometric configuration of the free-formed surface, which constitutes the substrate of the volume holographic optical elements, at the point on the Y axis with the largest absolute value within the effective ray limit, the X axis being defined to be perpendicular to the Y axis and a Z axis, the Y axis being defined to be perpendicular to the Z axis and to lie in a plane of decentration of the observation optical system, and the Z axis being defined as the axial principal ray as entering the entrance surface of the observation optical system.

5. An observation optical system having an entrance surface, a reflecting surface, and an exit surface, the observation optical system comprising:

a prism in which the reflecting surface is configured as a free-formed surface; and a volume holographic optical element provided to the free-formed surface of the prism, wherein the following conditions are satisfied:

$-0.28 < \phi x/\Phi x < 0.39$ $-0.29 < \phi y/\Phi y < 0.35$ $-0.52 < \phi mx/\Phi mx < 1.30$ $-0.52 < \phi my/\Phi my < 1.30$ where φx is a power, in a direction of an X axis, of the volume holographic optical element at a point of intersection of an axial principal ray with a surface of the volume holographic optical element, φy is a power, in a direction of a Y axis, of the volume holographic optical element at the point of intersection of the axial principal ray with the surface of the volume holographic optical element, Φx is a power, in the direction of the X axis, of a geometric configuration of the free-formed surface, which constitutes a substrate of the volume holographic optical element, at the point of intersection of the axial principal ray with the surface of the holographic optical element, Φy is a power, in the direction of the Y axis, of the geometric configuration of the free-formed surface, which constitutes the substrate of the volume holographic optical element, at the point of intersection of the axial principal ray with the surface of the volume holographic optical element, φmx is a power, in the direction of the X axis, of the volume holographic optical element at a point on the X axis with a largest absolute value within an effective ray limit, φmy is a power, in the direction of the Y axis, of the volume holographic optical element at a point on the Y axis with a largest absolute value within the effective ray limit, Φmx is a power, in the direction of the X axis, of the geometric configuration of the free-formed surface, which constitutes the substrate of the volume holographic optical element, at the point on the X axis with the largest absolute value within the effective ray limit, and Φmy is a power, in the direction of the Y axis, of the geometric configuration of the free-formed surface, which constitutes the substrate of the volume holographic optical elements, at the point on the Y axis with the largest absolute value within the effective ray limit, the X axis being defined to be perpendicular to the Y axis and a Z axis, the Y axis being defined to be perpendicular to the Z axis and to lie in a plane of decentration of the observation optical system, and the Z axis being defined as the axial principal ray as entering the entrance surface of the observation optical system.

6. An observation optical system comprising:

an image display element;

an eyepiece optical system introducing an image formed by the image display element into a center of a viewers eye so that the viewer is capable of observing the image as a virtual image; and a see-through optical element provided in a direction of a visual axis of the eyepiece optical system, canceling power in the direction of the visual axis and introducing an outside image in the direction of the visual axis into the center of the viewer's eye so that an image formed by the image display element with respect to the outside image is displayed as a virtual image and is superimposed on the outside image to make observations, the eyepiece optical system having an entrance surface, a reflecting surface, and an exit surface, the eyepiece optical system including:

a prism in which the reflecting surface is configured as a free-formed surface; and a volume holographic optical element provided to the free-formed surface of the prism, the volume holographic optical element being placed on the visual axis, the visual axis referring to a straight line connecting the virtual image with the center of the viewer's eye, wherein the following conditions are satisfied:

$-0.28 < \phi x/\Phi x < 0.39$ $-0.29 < \phi y/\Phi y < 0.35$ $-0.52 < \phi mx/\Phi mx < 1.30$ $-0.52 < \phi my/\Phi my < 1.30$ where φx is a power, in a direction of an X axis, of the volume holographic optical element at a point of intersection of an axial principal ray with a surface of the volume holographic optical element, φy is a power, in a direction of a Y axis, of the volume holographic optical element at the point of intersection of the axial principal ray with the surface of the volume holographic optical element, Φx is a power, in the direction of the X axis, of a geometric configuration of the free-formed surface, which constitutes a substrate of the volume holographic optical element, at the point of intersection of the axial principal ray with the surface of the holographic optical element, Φy is a power, in the direction of the Y axis, of the geometric configuration of the free-formed surface, which constitutes the substrate of the volume holographic optical element, at the point of intersection of the axial principal ray with the surface of the volume holographic optical element, φmx is a power, in the direction of the X axis, of the volume holographic optical element at a point on the X axis with a largest absolute value within an effective ray limit, φmy is a power, in the direction of the Y axis, of the volume holographic optical element at a point on the Y axis with a largest absolute value within the effective ray limit, Φmx is a power, in the direction of the X axis, of the geometric configuration of the free-formed surface, which constitutes the substrate of the volume holographic optical element, at the point on the X axis with the largest absolute value within the effective ray limit, and Φmy is a power, in the direction of the Y axis, of the geometric configuration of the free-formed surface, which constitutes the substrate of the volume holographic optical elements, at the point on the Y axis with the largest absolute value within the effective ray limit, the X axis being defined to be perpendicular to the Y axis and a Z axis, the Y axis being defined to be perpendicular to the Z axis and to lie in a plane of decentration of the observation optical system, and the Z axis being defined as the axial principal ray as entering the entrance surface of the eyepiece optical system.

* * * * *